United States Patent [19]

Abileah et al.

[11] Patent Number: 5,594,568
[45] Date of Patent: *Jan. 14, 1997

[54] LCD WITH A PAIR OF RETARDATION FILMS ON ONE SIDE OF NORMALLY WHITE LIQUID CRYSTAL LAYER

[75] Inventors: Adiel Abileah, Farmington Hills; John VanDerploeg, Davison; Gang Xu, Royal Oak, all of Mich.

[73] Assignee: OIS Optical Imaging Systems, Inc., Troy, Mich.

[ * ] Notice: The term of this patent shall not extend beyond the expiration date of Pat. No. 5,570,214.

[21] Appl. No.: 235,691

[22] Filed: Apr. 29, 1994

Related U.S. Application Data

[63] Continuation-in-part of Ser. No. 167,652, Dec. 15, 1993.

[51] Int. Cl.$^6$ ............................................. G02F 1/1335
[52] U.S. Cl. ............................................. 349/120; 349/119
[58] Field of Search ................................ 359/73

[56] References Cited

U.S. PATENT DOCUMENTS

| | | | |
|---|---|---|---|
| 3,900,248 | 8/1975 | Nagasaki | 359/73 |
| 4,385,806 | 5/1983 | Fergason | 359/73 |
| 4,436,379 | 3/1984 | Funada et al. | 359/53 |
| 4,632,514 | 12/1986 | Ogawa et al. | 359/68 |
| 4,652,088 | 3/1987 | Kando et al. | 359/63 |
| 4,674,841 | 6/1987 | Buzak | 359/73 |
| 4,686,519 | 8/1987 | Yoshida et al. | 359/40 |
| 4,693,562 | 9/1987 | Hasegawa et al. | 359/63 |
| 4,701,028 | 10/1987 | Clerc et al. | 359/73 |
| 4,844,569 | 7/1989 | Wada et al. | 359/73 |
| 4,852,976 | 8/1989 | Suzuki | 359/73 |
| 4,889,412 | 12/1989 | Clerc et al. | 359/73 |
| 4,957,349 | 9/1990 | Clerc et al. | 359/63 |
| 4,973,137 | 11/1990 | Kozaki | 359/74 |
| 4,984,873 | 1/1991 | Takiguchi et al. | 359/63 |
| 4,984,874 | 1/1991 | Yamamoto et al. | 359/63 |
| 4,991,941 | 2/1991 | Kalmanash | 359/73 |
| 4,995,704 | 2/1991 | Yamamoto et al. | 359/73 |
| 5,018,839 | 5/1991 | Yamamoto et al. | 359/73 |
| 5,032,008 | 7/1991 | Yamamoto et al. | 359/73 |
| 5,071,997 | 12/1991 | Harris | 528/353 |
| 5,107,356 | 4/1992 | Castleberry | 359/63 |
| 5,124,824 | 6/1992 | Kazaki et al. | 359/73 |
| 5,132,826 | 7/1992 | Johnson et al. | 359/73 |
| 5,138,474 | 8/1992 | Arakawa | 359/73 |
| 5,150,235 | 9/1992 | Haim et al. | 359/73 |
| 5,150,237 | 9/1992 | Iimura et al. | 359/73 |
| 5,157,529 | 10/1992 | Koopman et al. | 359/73 |
| 5,179,457 | 1/1993 | Hirataka et al. | 359/73 |
| 5,184,236 | 2/1993 | Miyashita et al. | 359/73 |
| 5,189,538 | 2/1993 | Arakawa | 359/73 |
| 5,194,975 | 3/1993 | Akatsuka et al. | 359/73 |

(List continued on next page.)

FOREIGN PATENT DOCUMENTS

| | | |
|---|---|---|
| 0349900 | 1/1990 | European Pat. Off. . |
| 0367616 | 5/1990 | European Pat. Off. . |
| 0576931 | 1/1994 | European Pat. Off. . |
| 55-45037 | 3/1980 | Japan . |
| 3-13916 | 1/1991 | Japan . |
| 2171549 | 8/1986 | United Kingdom . |

OTHER PUBLICATIONS

"Wide Viewing Angle LCD Using Retardation Films" by Yamagishi et al, Japan Display '89, pp. 316–319.

"The Symmetry Property of a 90 Degree Twisted Nematic Liquid Crystal Cell" by Lien.

*Primary Examiner*—Anita Pellman Gross
*Attorney, Agent, or Firm*—Myers Liniak & Berenato

[57] ABSTRACT

A normally white twisted nematic liquid crystal display is disclosed having a pair of retardation films disposed between the liquid crystal layer and an adjacent polarizer, both retardation films being on one side of the liquid crystal layer. Both retardation films, if uniaxial, have retardation values of from about 100–200 nm. Optionally, biaxial retarders ($n_x > n_y > n_z$) may be used, such biaxial retarders having retardation values from about $\Delta_{zx} = -100$ to $-200$ nm, and $\Delta_{zy} = -10$ to $-100$ nm. Accordingly, inversion is reduced and contrast rations are improved at large viewing angles.

23 Claims, 20 Drawing Sheets

U.S. PATENT DOCUMENTS

| | | | |
|---|---|---|---|
| 5,196,953 | 3/1993 | Yeh et al. | 359/73 |
| 5,227,903 | 7/1993 | Miyazawa et al. | 359/73 |
| 5,229,039 | 7/1993 | Ikeda et al. | 359/68 |
| 5,231,521 | 7/1993 | Johnson et al. | 359/73 |
| 5,237,438 | 8/1993 | Miyashita et al. | 359/73 |
| 5,241,408 | 8/1993 | Ishikawa et al. | 359/73 |
| 5,250,214 | 10/1993 | Kanemoto et al. | 359/63 |
| 5,344,916 | 9/1994 | Harris et al. | 528/353 |
| 5,369,513 | 11/1994 | Akatsuka et al. | 359/73 |
| 5,504,603 | 4/1996 | Winker et al. | 359/73 |

LCD WITH A PAIR OF RETARDATION FILMS ON ONE SIDE OF NORMALLY WHITE LIQUID CRYSTAL LAYER

RELATED APPLICATION

This is a continuation-in-part of Ser. No. 08/167,652 filed Dec. 15, 1993, pending the disclosure of which is hereby incorporated herein by reference.

This invention relates to a liquid crystal display having at least two retardation films. More particularly, this invention relates to a normally white liquid crystal display which includes a pair of retardation films disposed on one side of the liquid crystal layer so as to improve the viewing characteristics of the display.

BACKGROUND OF THE INVENTION

Liquid crystal materials are useful for electronic displays because light traveling through a layer of liquid crystal (LC) material is affected by the anisotropic or birefringent value ($\Delta N$) of the material, which in turn can be controlled by the application of a voltage across the liquid crystal material. Liquid crystal displays are desirable because the transmission or reflection of light from an external source, including ambient light and backlighting schemes, can be controlled with much less power than is typically required for illuminating previous displays. Liquid crystal displays (LCDs) are now commonly used in such applications as digital watches, calculators, portable computers, avionic cockpit displays, and many other types of electronic devices which utilize the liquid crystal display advantages of long-life and operation with low voltage/power consumption.

The information in many liquid crystal displays is presented in the form of a matrix array of rows and columns of numerals or characters which are generated by a number of segmented electrodes arranged in such a matrix pattern. The segments are connected by individual leads to driving electronics which apply a voltage to the appropriate combination of segments in order to display the desired data and information by controlling the light transmitted through the liquid crystal material.

Graphic information in, for example, avionic cockpit applications or television displays may be achieved by a matrix array of pixels which are connected by an X–Y sequential addressing scheme between two conventional sets of perpendicular conductor lines (i.e. row and column lines). More advanced addressing schemes typically use arrays of thin film transistors, diodes, MIMS, etc. which act as switches to control the drive voltage at the individual pixels.

Contrast ratio is one of the most important attributes determining the quality of both normally white (NW) and normally black (NB) liquid crystal displays. The contrast ratio in an NW display is determined in low ambient conditions by dividing the "off state" light transmission (high intensity white light) by the "on state" or darkened intensity. For example, if the "off state" transmission is 200 fL at a particular viewing angle and the "on state" transmission is 5 fL at the same viewing angle, then the display's contrast ratio at that particular viewing angle is 40 or 40:1 for the particular driving voltage utilized.

Accordingly, in normally white (NW) LCDs, the primary factor adversely limiting the contrast ratio is the amount of light which leaks through the display in the darkened or "on state". In normally black liquid crystal displays, the primary factor limiting the contrast achievable is the amount of light which leaks through the display in the darkened or "off state". The higher and more uniform the contrast ratio of a display over a wide range of viewing angles, the better the LCD.

Contrast ratio problems are compounded in bright environments such as sunlight and other high intensity ambient conditions where there is a considerable amount of reflected and scattered ambient light adjacent the display. The lesser the amount of ambient light reflected from the display panel, the better the viewing characteristics of the display. Therefore, it is desirable to have an LCD reflect as little ambient light as possible. The amount of ambient light reflected by a display panel is typically measured via conventional specular and diffused reflection tests.

The legibility of the image generated by both normally black (NB) and normally white (NW) liquid crystal display devices depends on viewing angle, especially in matrix address devices with large numbers of scanning electrodes. Absent a retardation film, the contrast ratio of a typical NW (and sometimes NB) liquid crystal display is usually at a maximum only within a narrow viewing or observing envelope centered about normal (0° horizontal viewing angle, 0° vertical viewing angle) and drops off as the angle of view increases.

It would be a significant improvement in the art to provide a liquid crystal display capable of presenting a uniform high quality, high contrast ratio image over a wide field of view with little or no ambient light reflection.

Normally black (NB) twisted nematic displays typically have better contrast ratio contour curves or characteristics than do their counterpart NW displays in that the NB displayed image can be seen better at larger viewing angles. However, NB displays are much harder to manufacture than NW displays due to their high dependence on the cell gap "d" of the liquid crystal material, as well as on the temperature of the liquid crystal material itself. Accordingly, a long felt need in the art has been the ability to construct a NW display with high contrast ratios over a large range of viewing angles, rather than having to resort to the more difficult to manufacture NB display to achieve these characteristics.

What is generally needed in normally white displays is an optical compensating or retarding element(s), i.e. retardation film, which introduces a phase delay that restores the original polarization state of the light, thus allowing the light to be blocked by the output polarizer in the on state. Optical compensating elements or retarders are known in the art and are disclosed, for example, in U.S. Pat. Nos. 5,184,236; 5,196,953; 5,138,474; and 5,071,997, the disclosures of which are hereby incorporated herein by reference. It is known that the polyimides and copolyimides disclosed by aforesaid U.S. Pat. No. 5,071,997 can be used as negative birefringent retarding elements in normally white liquid crystal displays and are said to be custom tailorable to the desired negative birefringent values without the use of stretching. The polyimide retardation films of U.S. Pat. No. 5,071,997 are uniaxial but with an optical axis oriented in the Z direction, i.e. perpendicular to the plane defined by the film.

FIG. 1 is a contrast ratio curve graph for a prior art normally white twisted nematic light valve. The light valve for which the contrast ratio curves are illustrated in FIG. 1 included a rear linear polarizer having a transmission axis defining a first direction, a front or light-exit linear polarizer having a transmission axis defining a second direction wherein the first and second directions were substantially perpendicular to one another, a liquid crystal material having a cell gap "d" of about 5.86 μm, a rear buffing zone (i.e. orientation film) oriented in the second direction, and a front buffing zone orientated in the first direction. The LC material was Model No. ZLI-4718 obtained from Merck. The temperature was about 34.4° C. when the graph illustrated by FIG. 1 was plotted. This light valve did not include a retarder. The above-listed parameters with respect to FIG. 1 are also applicable to FIGS. 2 and 3.

The contrast ratio graph of FIG. 1 was plotted utilizing a 6.8 V driving voltage, i.e. $V_{on}$, a 0.2 volt "off state" $V_{off}$ voltage, and by backlighting the display with white light. As can be seen in FIG. 1, at least about 10:1 contrast ratios extended along the 0° vertical viewing axis only to angles of about −40° horizontal and +38° horizontal. Likewise, at least about 30:1 contrast ratios extended along the 0° vertical viewing axis only to horizontal angles of about ±29°. This graph is illustrative of the common problems associated with typical normally white liquid crystal displays in that their contrast ratios at large horizontal and vertical viewing angles are limited.

FIG. 2 is a contrast ratio curve plot of the same normally white light valve described above with respect to FIG. 1. However, the FIG. 2 plot was formulated utilizing a $V_{on}$ of about 5.0 volts and a $V_{off}$ of about 0.2 volts. Again, the temperature was about 34.4° C. and white light was used. As can be seen by comparing the graphs of FIGS. 1 and 2, as the "on state" voltage applied to the liquid crystal material decreased, as in FIG. 2, the contrast ratio curves expanded horizontally and contracted vertically.

The 10:1 contrast ratio area of FIG. 2 along the 0° vertical viewing axis extended a total of about 85° (from about −45° to +40° horizontal) as opposed to only about 78° in FIG. 1. Also, the 30:1 contrast ratio area of FIG. 2 along the 0° vertical viewing axis extended horizontally about 67° as opposed to only about 58° in FIG. 1, the 30:1 ratio being, of course, represented by the contour line disposed between the 10:1 and 50:1 contour lines. With respect to vertical viewing angles, the contrast ratio areas of 10:1 and 30:1 in FIG. 2 did not extend along the 0° horizontal viewing axis to the negative vertical extent that they did in FIG. 1. In sum, the normally white light valve of FIGS. 1–3 had less than desirable contrast ratios at large viewing angles, these contrast ratios expanding horizontally and contracting vertically as the "on state" or driving voltage across the liquid crystal material decreased.

FIG. 3 is a driving voltage versus intensity (fL) plot of the prior art light valve described above with respect to FIGS. 1–2, this plot illustrating the gray level behavior of the prior art light valve. The various curves represent horizontal viewing angles from about −60° to +60° along the 0° vertical viewing axis.

Gray level performance and the corresponding amount of inversion are important in determining the quality of an LCD. Conventional liquid crystal displays typically utilize anywhere from about eight to sixty-four different driving voltages. These different driving voltages are generally referred to as "gray level" voltages. The intensity of light transmitted through the pixel or display depends upon the driving voltage. Accordingly, gray level voltages are used to generate dissimilar shades of color so as to create different colors when, for example, these shades are mixed with one another.

Preferably, the higher the driving voltage in a NW display, the lower the intensity (fL) of light transmitted therethrough.

Likewise then, the lower the driving voltage, the higher the intensity of light reaching the viewer. The opposite is true in normally black displays. Thus, by utilizing multiple gray level driving voltages, one can manipulate either a NW or NB liquid crystal display to emit desired intensities and shades of light. A gray level $V_{on}$ is generally known as any driving voltage greater than $V_{th}$ (threshold voltage) up to about 5.0–6.5 V.

Gray level intensity in LCDs is dependent upon the displays' driving voltage. It is desirable in NW displays to have an intensity versus driving voltage curve wherein the intensity of light emitted from the display or pixel continually and monotonically decreases as the driving voltage increases. In other words, it is desirable to have gray level performance in a NW pixel such that the intensity (fL) at 6.0 volts is less than that at 5.0 volts, which is in turn less than that at 4.0 volts, which is less than that at 3.0 volts, which is in turn less than that at 2.0 volts, etc. Such good gray level curves across wide ranges of viewing angles allow the intensity of light reaching the viewer via the pixel or display to be easily and consistently controlled.

Turning again to FIG. 3, the intensity versus driving voltage curves illustrated therein of the prior art light valve of FIGS. 1–2 having no retardation film(s) are undesirable because of the inversion humps present in the areas of the curves having driving voltages greater than about 3.2 volts. The intensity aspect of the curves monotonically decreases as the driving voltage increases in the range of from about 1.6–3.0 volts, but at a driving voltage of about 3.2 volts, the intensities at a plurality of viewing angles begin to rise as the voltage increases from about 3.2 volts to 6.8 volts. These rises in intensity as the voltage increases are known as "inversion humps." The inversion humps of FIG. 3 include only rise portions. However, such inversion humps often include both rise and fall portions as will be appreciated by those of ordinary skill in the art, thus enabling the "inversion humps" to actually look like humps.

A theoretically perfect driving voltage versus intensity curve with respect to a NW display would have a decreased intensity (fL) for each increase in gray level driving voltage at all viewing angles. In contrast to this, the inversion humps of FIG. 3 represent increases in intensity of radiation emitted from the light valve for each corresponding increase in gray level driving voltage above about 3.2 volts. Accordingly, it would satisfy a long felt need in the art if such a liquid crystal display could be provided with no or little inversion.

U.S. Pat. No. 5,184,236 discloses a NW display including a pair of retardation films provided on one side of the LC layer, these retardation films having retardation values of about 300–400 nm. The viewing characteristics of the LCDs of this patent could be improved upon with respect to contrast ratio, inversion, uniformity of viewing zone, and flexibility of the position of the viewing envelope by utilizing retarders of different values.

The parent of this application, i.e. Ser. No. 08/167,652, provides an NW display with a pair of retardation films having retardation values of about 80–200 nm, one film being disposed on each side of the LC layer. While the different embodiments of Ser. No. 08/167,652 provides excellent results with respect to all viewing characteristics, the disclosure of this application provides similar results via different optical structure.

FIG. 4 illustrates the angular relationships between the horizontal and vertical viewing axes and angles described herein relative to a liquid crystal display and conventional LCD angles φ and Θ. The +X, +Y, and +Z axes shown in FIG. 6 are also defined in other figures herein. Furthermore, the "horizontal viewing angles" (or $X_{ANG}$) and "vertical viewing angles" (or $Y_{ANG}$) illustrated and described herein may be transformed to conventional LCD angles: azimuthal angle ϕ; and polar angle Θ, by the following equations:

$$TAN\ (X_{ANG})=COS\ (\phi)\cdot TAN\ (\Theta)$$

$$SIN\ (Y_{ANG})=SIN\ (\Theta)\cdot SIN\ (\phi)$$

or $$COS\ (\Theta)=COS\ (Y_{ANG})\cdot COS\ (X_{ANG})$$

$$TAN\ (\phi)=TAN\ (Y_{ANG})\div SIN\ (X_{ANG})$$

The term "rear" when used herein but only as it is used to describe substrates, polarizers, electrodes, buffing zones and orientation films means that the described element is on the incident light or backlight side of the liquid crystal material, or in other words, on the side of the liquid crystal material opposite the viewer.

The term "front" when used herein but only as it is used to describe substrates, polarizers, electrodes, buffing zones and orientation films means that the described element is located on the viewer side of the liquid crystal material.

The LCDs and light valves herein included liquid crystal material with a birefringence (ΔN) of 0.084 at room temperature, Model No. ZLI-4718 obtained from Merck.

The term "retardation value" as used herein means "d·ΔN" of the retardation film or plate, wherein "d" is the film thickness and "ΔN" is the film birefringence (either positive or negative).

The term "interior" when used herein to describe a surface or side of an element (or an element itself), means the side or surface closest to the liquid crystal material.

The term "light valve" as used herein means a liquid crystal display including a rear linear polarizer, a rear transparent substrate, a rear continuous pixel electrode, a rear orientation film, an LC layer, a front orientation film, a front continuous pixel electrode, a front substrate, and a front polarizer (without the presence of color filters and driving active matrix circuitry such as TFTs). Such a light valve may also include a pair of retardation films disposed on either side of the LC layer as described with respect to each Example herein. In other words, a "light valve" may be referred to as one giant pixel.

It is apparent from the above that there exists a need in the art for a normally white liquid crystal display wherein the viewing zone of the display includes high contrast ratios over a large range of vertical and horizontal viewing angles with little or no inversion and/or ambient reflection from the display panel.

This invention will now be described with respect to certain embodiments thereof, accompanied by certain illustrations, wherein:

SUMMARY OF THE INVENTION

Generally speaking, this invention fulfills the above-described needs in the art by providing a normally white liquid crystal display comprising:

a rear, light-entrance polarizer having a transmission axis oriented in a first direction;

a front, light-exit polarizer having a transmission axis oriented in a second direction with respect to the first direction so as to define a normally white display;

a twisted nematic liquid crystal layer;

first and second positively birefringent uniaxial retardation films both disposed between the twisted nematic liquid crystal layer and one of: (i) the rear, light-entrance polarizer; and (ii) the front, light-exit polarizer;

wherein the liquid crystal layer in the off state twists at least one normally incident visible wavelength of light less than about 110° as it passes therethrough, and the first and second uniaxial retardation films have retardation values of from about 80–200 nm; and wherein the transmission axes of the polarizers and optical axes of the retardation films are so arranged each with respect to the others so as to achieve high contrast ratios over a large range of predetermined viewing angles.

In certain preferred embodiments of this invention, the display exhibits contrast ratios of at least about 10:1 along the 0° vertical viewing axis at horizontal viewing angles of about ±55°.

In certain further preferred embodiments of this invention, the liquid crystal layer is from about 4.8–6.5 μm thick with a birefringence of from about 0.075–0.095 at room temperature; and an angle of from about 80°–100° is defined between the respective optical axes of the first and second retardation films.

This invention further fulfills the above-described needs in the art by providing a normally white liquid crystal display comprising:

a rear, light-entrance polarizer having a transmission axis oriented in a first direction;

a front, light-exit polarizer having a transmission axis oriented in a second direction wherein the first and second directions are oriented so as to define a normally white display;

first and second biaxial retardation films both disposed between a twisted nematic liquid crystal layer and one of the rear and front polarizers, wherein the liquid crystal layer in the off state twists at least one wavelength of normally incident visible light at least about 85° as it passes therethrough; and wherein the first and second biaxial retardation films have the following retardation values:

$$d\cdot\Delta_{ZX}=\text{from about }-100\text{ to }-200\text{ nm}$$

$$d\cdot\Delta_{ZY}=\text{from about }-10\text{ to }-100\text{ nm}$$

wherein $n_X>n_Y>n_Z$ and "d" is the thickness of the film such that the viewing zone of the display has high contrast ratios and reduced inversion throughout an enlarged range of viewing angles.

In certain other preferred embodiments of this invention, the first and second biaxial retardation films have the following retardation values: (i) d·$\Delta_{ZX}$=from about −120 to −180 nm; and (ii) d·$\Delta_{ZY}$=from about −40 to −80 nm.

In still other preferred embodiments of this invention, the optical axes of the first and second biaxial retardation films having the largest indices of refraction (i.e. $n_X$) have retardation values of from about −140 to −180 nm.

IN THE DRAWINGS

DETAILED DESCRIPTION OF CERTAIN EMBODIMENTS OF THIS INVENTION

Figure 1:
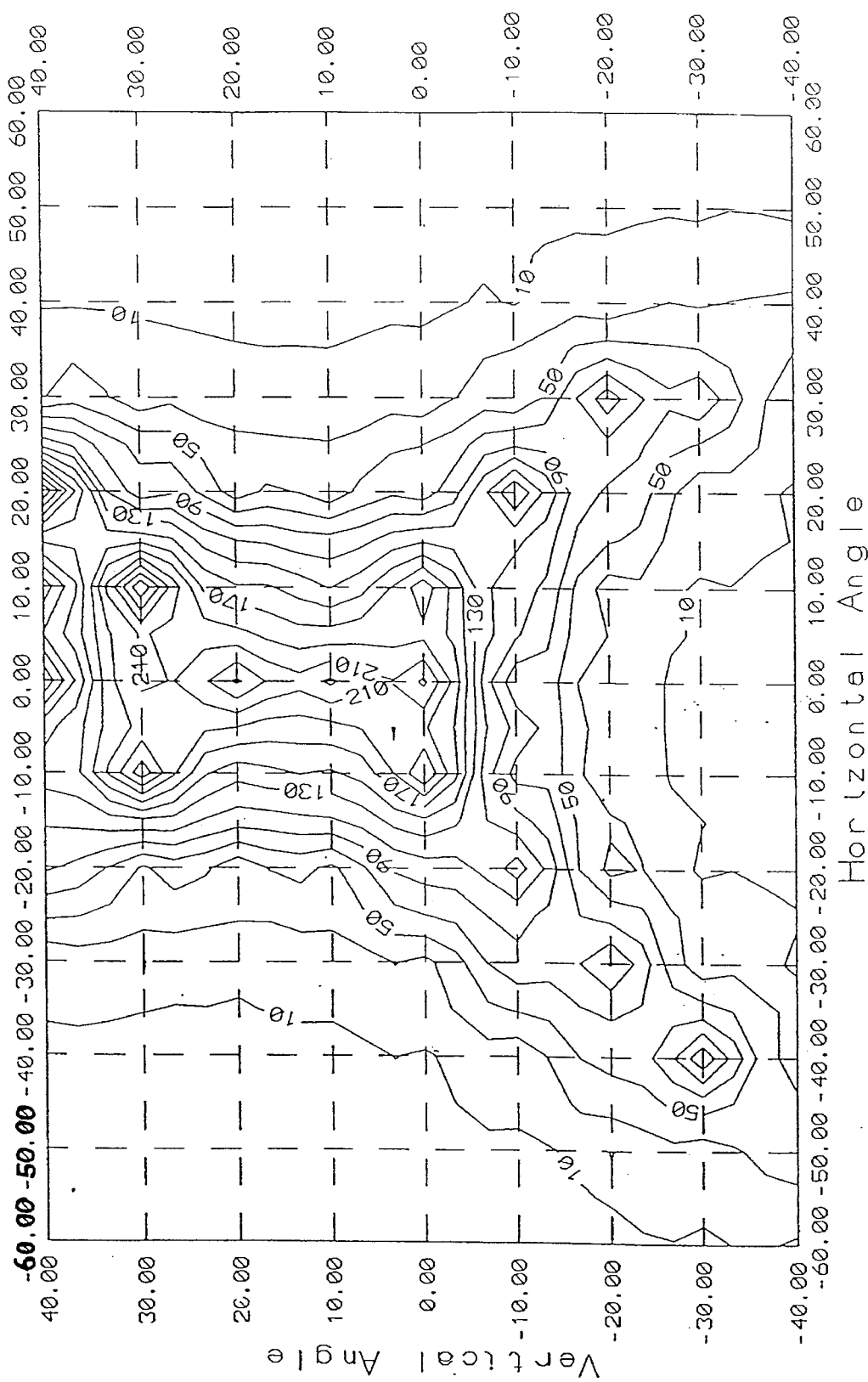
FIG. 1 is a contrast ratio plot of a prior art light valve which utilized white light and an "on state" driving voltage of about 6.8 volts.
Figure 2:
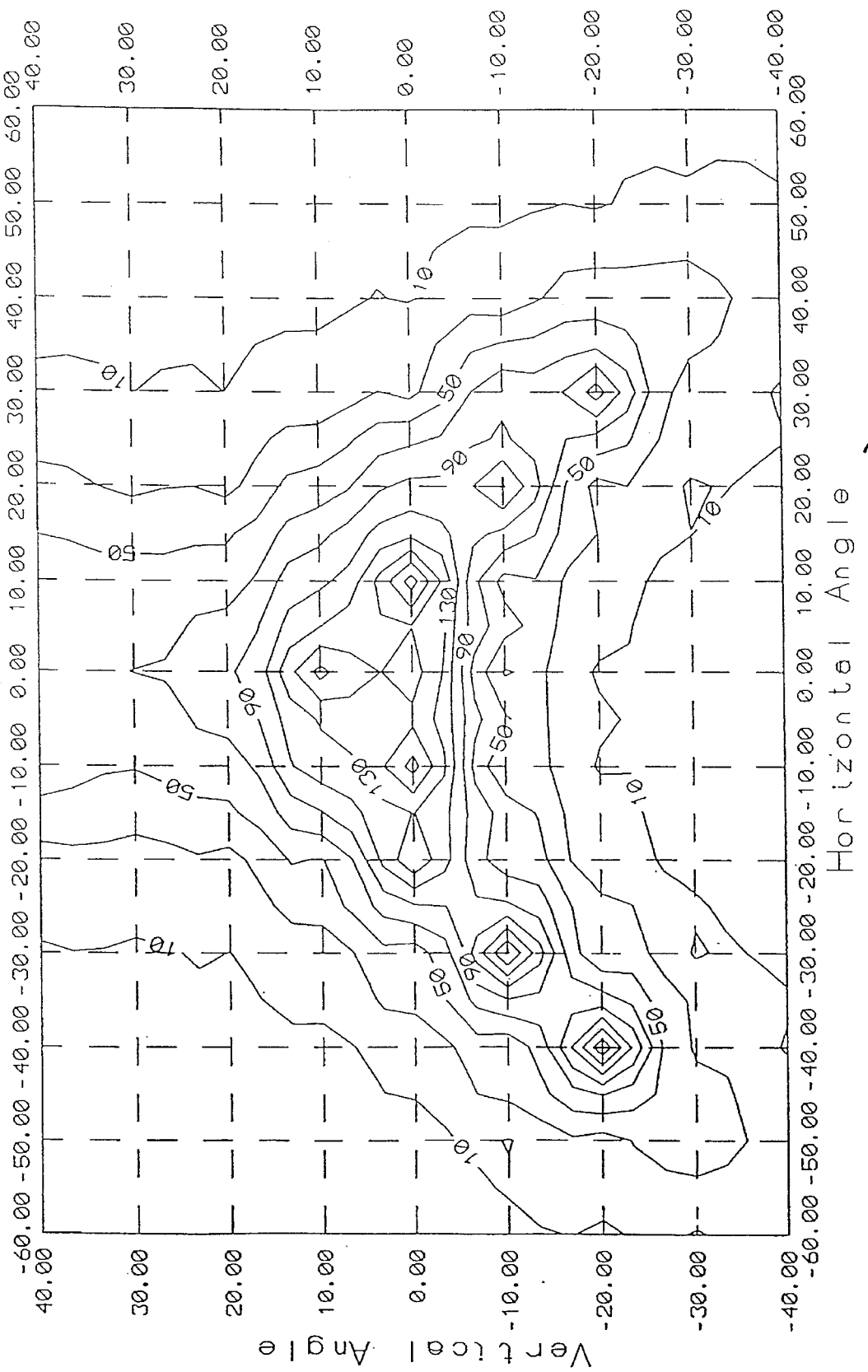
FIG. 2 is a white light contrast ratio curve plot of the prior art light valve of FIG. 1 utilizing about a 5.0 V "on state" driving voltage.

Referring now more particularly to the accompanying drawings in which like reference numerals indicate like parts.

Figure 5:
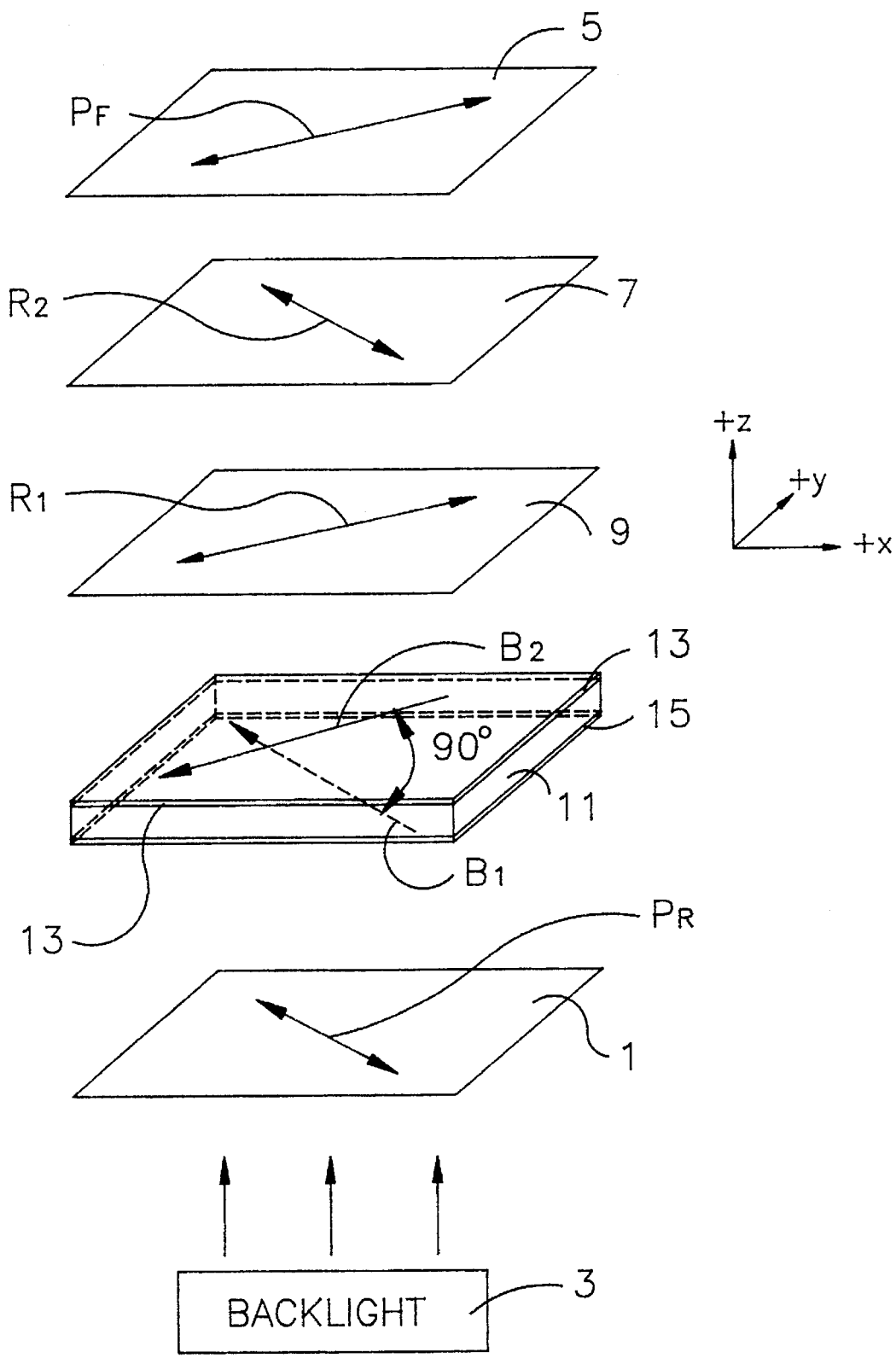
FIG. 5 is an exploded perspective schematical diagram of the optical components and their respective orientations of a first embodiment of this invention wherein a pair of retardation films are disposed forward of the liquid crystal layer.

FIG. 5 is an exploded schematic view of the optical components and their respective orientations of a first embodiment of this invention. As shown, this display (or display assembly) includes from the rear forward toward the viewer, conventional backlight 3, rear or light-entrance linear polarizer 1, rear buffing or orientation film 15, liquid crystal layer 11, front buffing or orientation film 13, first retardation film 9, second retardation film 7, and finally front or light-exit linear polarizer 5.

Backlight 3 is conventional in nature and emits substantially collimated light toward the display panel and rear polarizer 1 in one preferred embodiment of this invention. Backlight 3 may be, for example, the backlighting assembly disclosed in commonly owned U.S. Pat. No. 5,161,041, the disclosure of which is hereby incorporated herein by reference. Other high intensity conventional substantially collimated backlight assemblies may also be used.

Rear and front linear polarizers 1 and 5, respectively, are conventional in nature and have their respective linear transmission axes $P_R$ and $P_F$ oriented such that the display is of the normally white (NW) type. In other words, when a driving voltage below $V_{th}$ is applied across liquid crystal layer 11, transmission axes $P_R$ and $P_F$ are oriented such that the light emitted from backlight 3 proceeds through polarizer 1, is twisted by liquid crystal material 11, and exits polarizer 5 so as to allow the light to reach the viewer. Thus, a pixel in which a voltage<$V_{th}$ is applied is in the "off state" and appears white to the viewer.

However, when a substantial driving voltage (e.g. about 6 volts) is applied across selected pixels in liquid crystal layer 11, the light which is transmitted through polarizer 1 and LC layer 11 is substantially blocked by front polarizer 5 due to the fact that the polarization direction of light reaching the interior surface of front polarizer 5 is substantially perpendicular to the direction of transmission axis $P_F$ thus resulting in substantially no light reaching the viewer by way of the selected pixels. Thus, the selected pixels in which a driving voltage>$V_{th}$ is applied to the LC layer appear darkened to the viewer, these pixels said to be in the "on state".

In certain preferred embodiments of this invention, transmission axis $P_R$ of rear polarizer 1 and corresponding transmission axis $P_F$ of front linear polarizer 5 are oriented in a manner substantially perpendicular to one another so as to define a normally white twisted nematic cell. However, they may be oriented in other conventional manners which also allow the cell or display to be of the normally white type.

Rear and front orientation films 15 and 13, respectively, are conventional in nature and are made of a substantially transparent polyimide material in certain embodiments of this invention. Rear orientation film 15 is conventionally buffed or oriented in direction $B_1$ as shown in FIG. 5. Likewise, front orientation film 13 is conventionally buffed or oriented in direction $B_2$. Buffing directions $B_1$ and $B_2$ are oriented substantially perpendicular to one another in certain embodiments of this invention so as to allow the molecules of liquid crystal layer 11 to be twisted from about 80°–100°, most preferably about 90°, when in the off or non-driven state. The term "off state" means that a voltage below the threshold voltage, i.e. $V_{th}$, is applied across the liquid crystal material (and therefore only a white [or colored if color filters are being used] screen is displayed).

Buffing directions $B_1$ and $B_2$ of orientation films 15 and 13 provide the off state LC material 11 with about a 90° twist, directions $B_1$ and $B_2$ being substantially perpendicular to one antoher. Due to the orientation of buffing directions $B_1$ and $B_2$ of rear and front orientation films 15 and 13, respectively, the polarization direction of normally incident light emitted from backlight 3 reaching liquid crystal material 11 is twisted by the liquid crystal molecules as it passes through layer 11, when, of course, the display is in the off state.

However, when a substantially full driving voltage, i.e. about 6.0 volts or above, is applied to liquid crystal layer 11 or selected pixels thereof to form the intended image, the normally incident light from backlight 3 reaching the liquid crystal layer is permitted to pass through each buffed film 15 and 13 thereby maintaining its initial direction of polarization. This is due to the fact that when a voltage is applied across liquid crystal material 11, the molecules thereof are caused to become substantially aligned with one another in the vertical direction as shown in FIG. 5. Therefore, substantially little or no twisting occurs and the direction of polarization of light passing through layer 11 is substantially maintained.

The amount of voltage applied across liquid crystal material 11 determines the degree of twisting of the LC molecules in layer 11 and thus dictates the polarization direction of light emitted from the front or viewer side of liquid crystal material 11. In turn, the polarization direction of light reaching polarizer 5 dictates the amount of light which reaches the viewer in that the closer aligned transmission axis $P_F$ and the polarization direction of light reaching polarizer 5 from LC material 11, the more light which is allowed to pass and reach the viewer.

Retardation films 7 and 9 in this first embodiment are disposed on the front or viewer side of liquid crystal material 11 thereby being sandwiched between front polarizer 5 and the LC layer. It has been surprisingly found that the provision of both retarder films on one side of LC layer 11 reduces inversion and improves the contrast ratio at large viewing angles when the retardation value of such film is reduced significantly (e.g. down to retardation values of from about 100–200 nm) from the values of the prior art. Retardation films 7 and 9 in certain embodiments of this invention may be obtained from, for example, Nitto Corporation, Japan, or Nitto Denko American, Inc., New Brunswick, N.J., as Model No. NRF-RF120 (120 nm retarder). Such retardation films are uniaxial, positively birefringent, and have positive retardation values useful in the practice of this invention.

Alternatively, biaxial retardation films may also be utilized as retarders 7 and 9, such films being obtainable, for example, from Allied Signal Corporation and producing similarly surprising results. Furthermore, negatively birefringent uniaxial/biaxial soluble polyimide retardation films (see Ser. No. 08/167,652) obtainable from the University of Akron and disclosed in U.S. Pat. No. 5,071,997, the disclosure of which is incorporated herein by reference, may also be utilized as films 7 and 9.

Optical axes $R_1$ and $R_2$ of retardation films 9 and 7 are oriented in a manner substantially perpendicular to one another in certain embodiments of this invention. However, optical axes $R_1$ and $R_2$ may also be arranged so as to define an angle of from about 75°–105° therebetween. Such an adjusting from the perpendicular allows the viewing zone of the display to be shifted as more thoroughly discussed in aforesaid U.S. Ser. No. 08/167,652.

When films 9 and 7 are of the uniaxial positively birefringent type, axes $R_1$ and $R_2$ represent the optical axes of the films. However, when films 9 and 7 are of the biaxial type, axes $R_1$ and $R_2$ represent the optical axis of each respective film having the largest index of refraction (i.e. $n_X$), with the optical axis of each film having the intermediate index of refraction ($n_Y$) being substantially perpendicular to the illustrated axis and the optical axis having the smallest index of refraction ($n_Z$) being oriented substantially normal to $n_X$ and $n_Y$ in certain embodiments of this invention as shown in FIG. 21.

Figure 20:
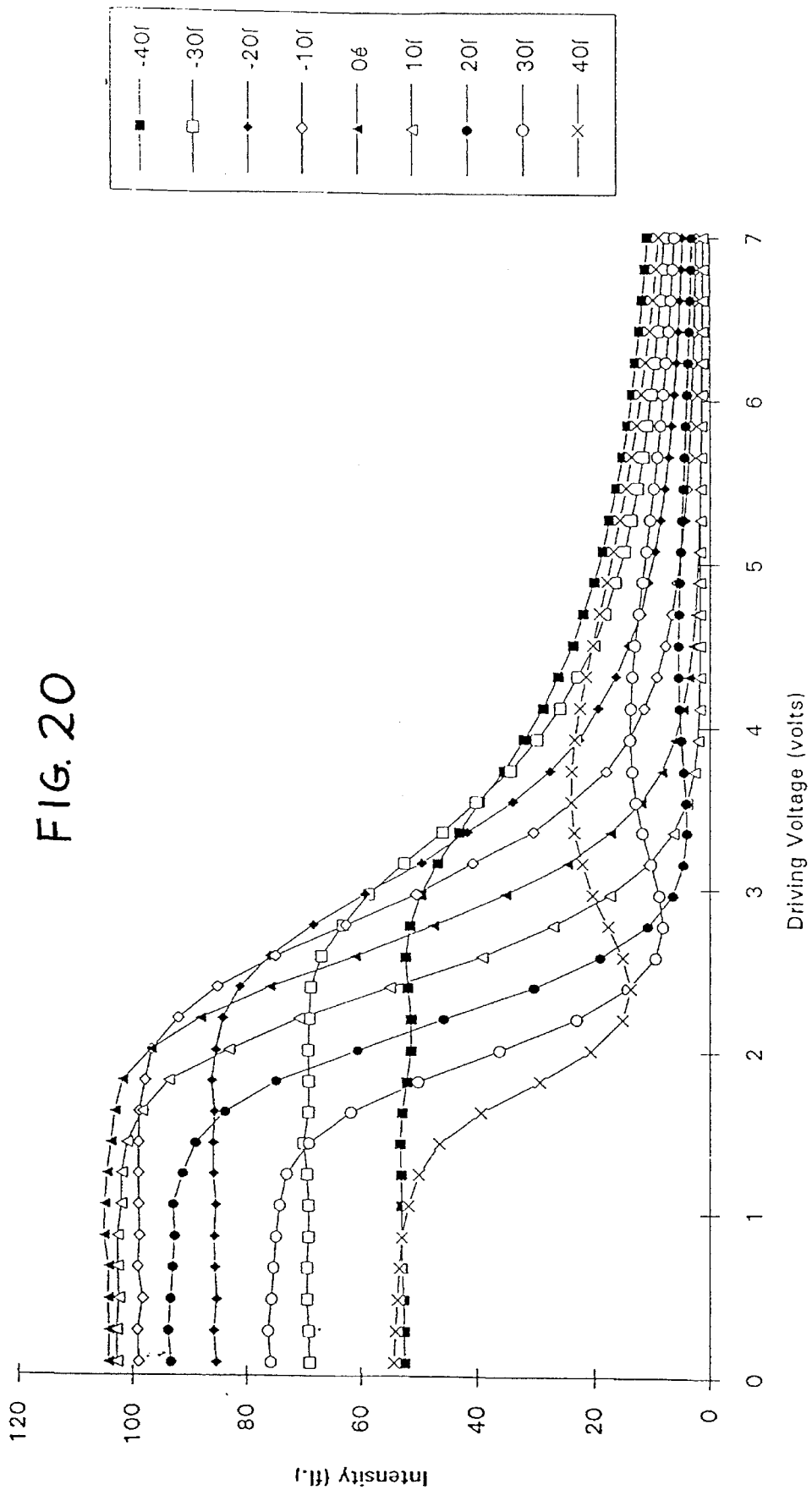
FIG. 20 is a transmission (fL) versus driving voltage plot for the NW AMLCD of Example 5 for a plurality of vertical viewing angles along the 0° horizontal viewing axis.
Figure 21:
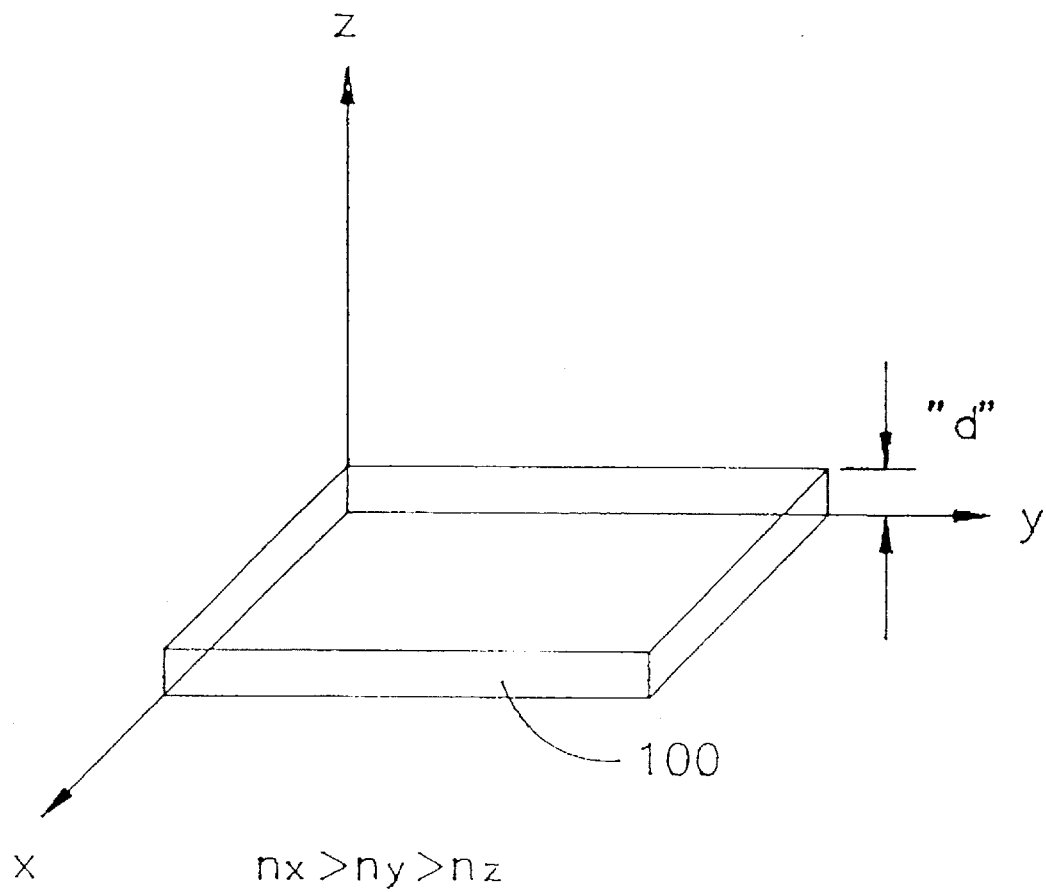
FIG. 21 is a perspective optical diagram of a biaxial retardation film including optical axes X, Y, and Z, along with indices of refraction $n_X>n_Y>n_Z$ wherein axes X, Y, and Z are separate and distinct from viewing angle directions X, Y, and Z herein.

In other words, when biaxial films are used, the equation $n_X > n_Y > n_Z$ is satisfied, with directions X, Y and Z of the terms $n_X$, $n_Y$, and $n_Z$ respectively being shown in FIG. 21. FIG. 21 is a diagram of biaxial retardation film 100 having thickness "d" and indices of refraction $n_X$, $n_Y$, and $n_Z$. Biaxial retardation films 7 and 9 have retardation values $\Delta_{ZX}$ and $\Delta_{ZY}$; where $\Delta_{ZX} = d \cdot (n_Z - n_X)$ and $\Delta_{ZY} = d \cdot (n_Z - n_Y)$, "d" being the thickness of the film. The X, Y, and Z directions shown in FIG. 21 of indices of refraction $n_X$, $n_Y$, and $n_Z$ respectively are separate and distinct from viewing angle directions X, Y, and Z shown in FIGS. 1, 2, 4–8, and 10–20.

In certain embodiments of this invention when the aforesaid positively birefringent uniaxial retardation films are used as films 7 and 9, both have preferred retardation values of from about 80 to 200 nm. More preferably, retardation films 7 and 9 when uniaxial have retardation values of from about 100 to 180 nm, and most preferably have retardation values of from about 120 to 160 nm. Such retardation values fly directly in the face of the teachings of the prior art. The prior art, such as U.S. Pat. No. 5,184,236, generally teaches the use of uniaxial retardation films having values greater than about 300 nm in normally white twisted nematic displays. The advantages of utilizing retardation films with retardation values according to the teachings of this invention include a larger and more uniform viewing zone, reduced inversion, and the ability to shift the viewing zone vertically away from potential inversion areas without substantially distorting the viewing envelope.

When biaxial films 7 and 9 are used, the retardation values are preferably from about $d \cdot \Delta_{ZX} = -100$ to $-200$ nm, and about $d \cdot \Delta_{ZY} = -10$ to $-100$ nm.

The retardation values of films 7 and 9 are preferably about the same in certain embodiments of this invention so as to define a viewing zone substantially symmetrical about the 0° horizontal viewing axis. The greater the difference between the retardation values of films 7 and 9, the greater the loss of symmetry of viewing about the 0° horizontal axis. This, of course, may be desirable in certain embodiments of this invention. Thus, different valued films may be used to adjust the viewing zone.

The provision of both retardation films 7 and 9 on one side of liquid crystal layer 11, as opposed to disposing one on each side of layer 11 (see aforesaid Ser. No. 08/167,652), results in a viewing zone which, while exhibiting excellent viewing characteristics and contrast ratios, may be elongated in one horizontal direction more so than the other so as to having better viewing characteristics on a particular side of the zero degree horizontal viewing axis. This will be discussed more fully in the below listed examples.

Figure 6:
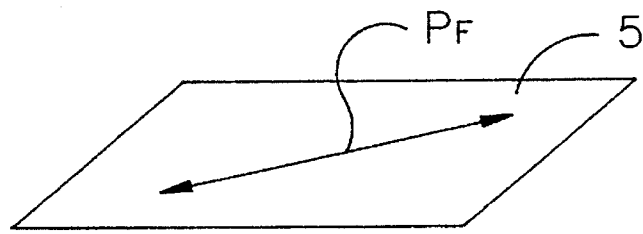
FIG. 6 is an exploded perspective schematical view of the optical components and their respective orientations of a second embodiment of this invention wherein a pair of retardation films (uniaxial or biaxial) are disposed rearward of the liquid crystal material so as to reduce ambient light reflection off of the display panel.
Figure 6:
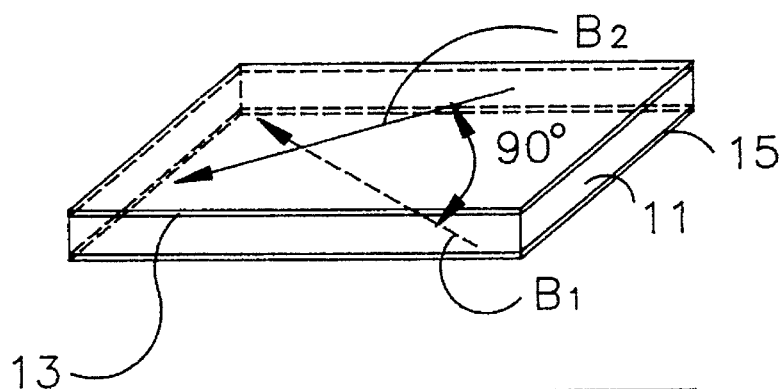
Figure 6:
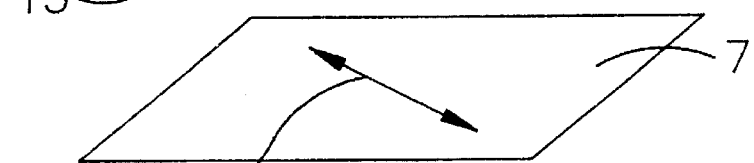
Figure 6:
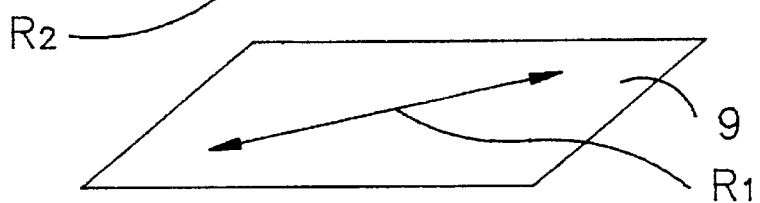
Figure 6:
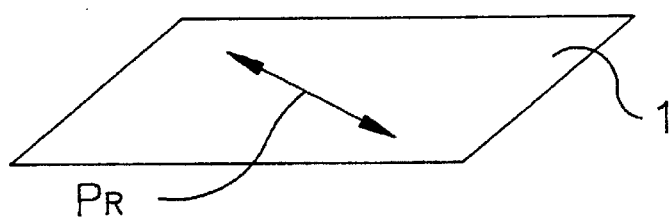
Figure 6:
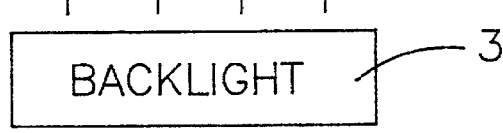

FIG. 6 is an exploded schematic view of the optical components and their respective orientations of a second embodiment of this invention. As shown, the only difference between this second embodiment and the first or FIG. 5 embodiment is that retardation films 7 and 9 in this embodiment are disposed rearward of liquid crystal layer 11, or between rear polarizer 1 and LC layer 11.

The disposition of both retardation films 7 and 9 rearward of liquid crystal layer 11 reduces the amount of ambient light reflection off of the display panel. Ambient light reflection is typically known in the art to interfere with the viewing of LCDs and is measured conventionally via diffused and specular reflection tests.

When ambient light is directed towards the front of a display panel, a certain portion thereof is inevitably reflected off of the panel and directed back toward the viewer thereby interfering with the viewing of the display. Such reflections are in part caused by mismatches of indices of refraction present in the display panel. The provision of two optical elements (e.g. a substrate and a retardation film) adjacent one another, each having a different index of refraction, results in a mismatch of indices of refraction and causes reflection of ambient light back toward the viewer. Therefore, it is desirable to have as few mismatches of indices of refraction as possible near the front of the display panel.

In a typical multi-colored AMLCD, once the ambient light directed toward the front of the display panel reaches liquid crystal layer 11, it proceeds into and through a plurality of color filters (not shown) generally disposed adjacent one side of liquid crystal layer 11. These color filters, preferably red, green, and blue arranged in a triangular or rectangular manner to form each pixel, absorb up to about 50%, or even about 67% in some cases, of the ambient light which reaches them. Thus, after reaching the color filters and being absorbed thereby, the absorbed portion can no longer be reflected back toward the viewer so as to disturb the viewing characteristics of the display.

Accordingly, mismatching of indices of refraction rearward (i.e. on the backlight side) of the color filters is preferable over such mismatches disposed forward of the color filters due to the fact that a portion of the ambient light reaching the color filters is absorbed thereby and prevented from being reflected. Furthermore, light being reflected via mismatched indices disposed rearward of the color filters is partially absorbed by such filters on its way back toward the viewer.

Generally speaking, retardation films 7 and 9 have different indices of refraction than do polarizers 1 and 5 and transparent glass substrates 21 and 22. Therefore, the provision of retardation films 7 and 9 forward of liquid crystal layer 11 creates an added number of mismatched indices of refraction forward of liquid crystal layer 11, these mismatches, of course, resulting in undesirable ambient light reflection back towards the viewer.

However, when, as shown in FIG. 6, retardation films 7 and 9 are positioned rearward of LC layer 11, the number of mismatched indices of refraction forward of LC layer 11 and the color filters is reduced with respect to the first embodiment (i.e. FIG. 5) of this invention. Therefore, less ambient light is reflected back towards the viewer and the display exhibits better viewing characteristics. Thus, the rationale is clear for positioning both films 7 and 9 rearward of liquid crystal layer 11 in certain embodiments of this invention.

Figure 7:
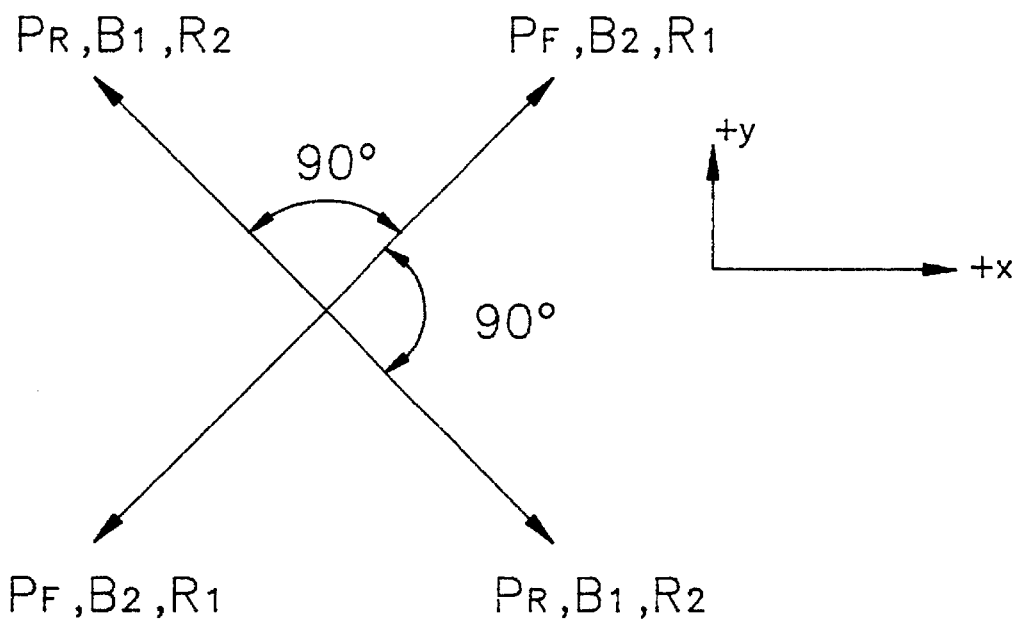
FIG. 7 is a top view illustrating the optical component angular relationships of either of the displays of FIGS. 5 or 6 according to an embodiment of this invention.
Figure 8:
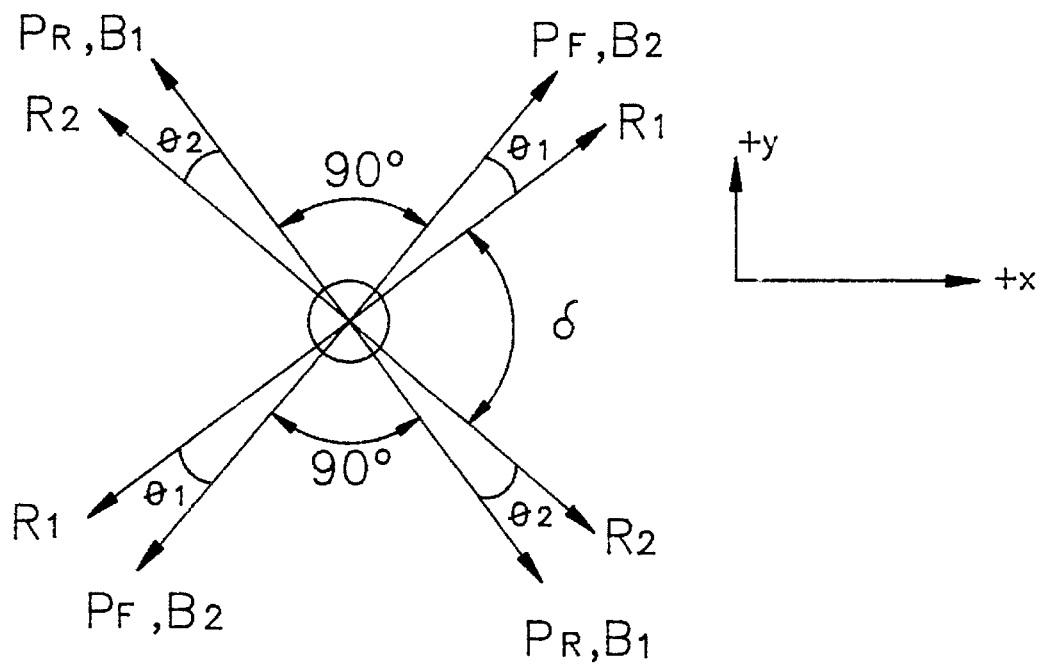
FIG. 8 is a top view illustrating the optical component angular relationship between respective optical axes of either of the displays of FIGS. 5 or 6 according to another embodiment of this invention.

FIGS. 7 and 8 illustrate numerous angular relationships between the respective axes of the polarizers, orientation films, and retardation films of the first and second embodiments of this invention.

As shown in FIG. 7, transmission axis $P_R$ of rear polarizer 1, buffing direction $B_1$ of rear orientation film 15, and optical axis $R_2$ of retardation film 7 are all aligned substantially parallel (i.e. ± about 10°) to one another, while transmission axis $P_F$ of front polarizer 5, buffing direction $B_2$ of front orientation film 13, and optical axis $R_1$ of retardation film 9 are also aligned substantially parallel to one another. These two groupings of axes are oriented substantially perpendicular to one another as shown in FIGS. 7 thus illustrating one preferred embodiment of this invention.

FIG. 8 illustrates the angular relationship between the above discussed optical axes in another preferred embodiment of this invention. In this embodiment, optical axes $R_1$ and $R_2$ of retardation films 9 and 7, respectively, are preferably symmetrically rotated negatively so as to shift the central location of the display's viewing zone to a position below the 0° vertical viewing axis while substantially preserving its uniformity of shape. This embodiment, of course, utilizes the same parameters as discussed above except for the angular orientation of optical axes $R_1$ and $R_2$ of retardation films 7 and 9. Directions $B_1$ and $B_2$, as well as axes $P_R$ and $P_F$, define angles of about 90° therebetween in this embodiment.

The difference between this embodiment and the FIG. 7 embodiment is that here, as shown in FIG. 8, optical axis $R_1$ is rotated so as to define angle $\Theta 1$ between transmission axis $P_F$ of front polarizer 5 and optical axis $R_1$. Also, optical axis $R_2$ is rotated so as to define angle $\Theta 2$ between transmission axis $P_R$ of rear polarizer 1 and axis $R_2$. Optical axis $R_1$ of retardation film 9 is rotated clockwise relative to directions $P_F$ and $B_2$ while optical axis $R_2$ is rotated counterclockwise relative to $P_R$ and $B_1$. This is what is meant by the optical axes of the retardation films being rotated "negatively". Alternatively, only one of axes $R_1$ and $R_2$ need be rotated.

In one embodiment, angles $\Theta 1$ and $\Theta 2$ as shown in FIG. 8 are substantially equal to one another thereby defining a viewing zone for the normally white display which is substantially symmetrical about the 0° horizontal viewing axis. Because optical axis $R_2$ has been rotated counterclockwise and optical axis $R_1$ of retardation film 9 has been rotated clockwise to substantially equal extents, the display of this embodiment is said to have its retardation films rotated negatively in a substantially symmetrical manner. The term "symmetrical" means that angles $\Theta 1$ and $\Theta 2$ are substantially equal to one another. Alternatively, angles $\Theta 1$ and $\Theta 2$ may be different in value so as to alter the viewing envelope.

For example, if the normally white display illustrated by FIG. 8 were to have its retardation film axes rotated −8° symmetrically, angles $\Theta 1$ and $\Theta 2$ would each be about 4° as shown in FIG. 8. Therefore, angle δ between directions $R_1$ and $R_2$ would be about 82° when retardation films 7 and 9 in this embodiment were rotated −8° symmetrically. It should be clear then that if optical axes $R_1$ and $R_2$ of retardation films 9 and 7, respectively, were to be rotated −4° symmetrically, angles $\Theta 1$ and $\Theta 2$ would each be about 2° while angle δ would be about 86°. Axes $R_1$ and $R_2$ are envisioned as being rotated to extents of about ±20° symmetrically.

The purpose of rotating optical axes $R_1$ and $R_2$ of the retardation films is to shift the central location of the viewing zone vertically (preferably in a direction away from the potential inversion areas located in the positive vertical viewing angle region) while still substantially maintaining its uniformity of shape. In the liquid crystal display art, different customers often desire different viewing characteristics with respect to the position of the effective and highest contrast viewing zone. Because of the often different requirements for different customers, it is advantageous to have a display which may have its viewing zone shifted vertically in accordance with a customer's needs simply by rotating the optical axes $R_1$ and $R_2$ of its retardation films.

By rotating axes $R_1$ and $R_2$ of retardation films 9 and 7 to a predetermined negative extent symmetrically, the viewing zone, while being substantially maintained with respect to shape, is shifted to a position centered substantially below the 0° vertical viewing axis and, therefore, away from potential inversion zones present above the 0° vertical viewing axis. Such shifts with respect to viewing zones are discussed and shown graphically in aforesaid Ser. No. 08/167,652.

Alternatively, optical axes $R_1$ and $R_2$ may be rotated to predetermined positive values, preferably symmetrically. The result in such a case is a shifting of the viewing zone to a position centered substantially above the 0° vertical viewing axis.

Figure 9:
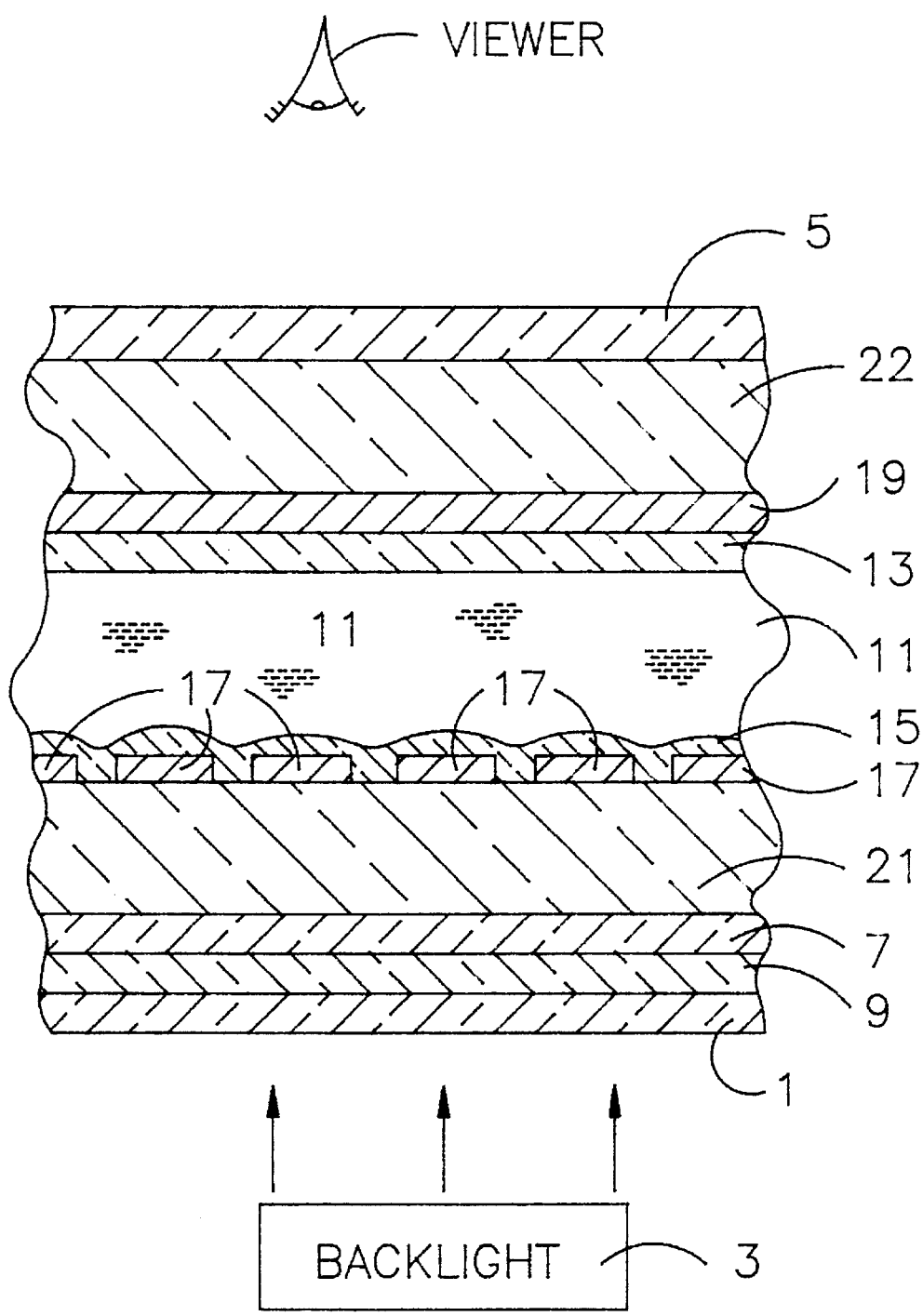
FIG. 9 is a side elevational cross sectional view of the liquid crystal display of FIG. 6 according to an embodiment of this invention.

FIG. 9 is a side elevational cross sectional view of a liquid crystal display panel and corresponding backlight 3 according to the second or FIG. 6 embodiment of this invention. As shown, the display panel includes from the rear forward toward the viewer, rear linear polarizer 1, first retardation film 9, second retardation film 7, rear transparent substrate 21 preferably made of glass or plastic, individual pixel or colored subpixel electrodes 17, substantially transparent rear polyimide orientation film 15, liquid crystal layer 11 having a thickness "d", front orientation film 13, front common electrode 19, front transparent substrate 22 preferably made of glass or plastic, and finally front linear polarizer 5. It will be recognized by those of skill in the art that the aforesaid FIG. 5 embodiment of this invention may be represented cross sectionally by simply repositioning retardation films 7 and 9 from their positions shown in FIG. 9 to a position between front substrate 22 and front polarizer 5.

Alternatively, retardation films 7 and 9 may be disposed interior of one of transparent substrates 21 and 22 as opposed to their exterior disposition shown in FIG. 9.

When red, green, and blue color filters (not shown) are utilized, they may be disposed between electrode 19 and substrate 22, each color filter being aligned so as to correspond to a particular subpixel electrode 17.

With reference to FIGS. 6, 7, and 9, in a typical operation of this embodiment, the display operates as follows: light is first emitted from conventional backlight assembly 3. The normally incident light rays originating from the backlight assembly make their way toward the display panel and first come into contact with rear linear polarizer 1.

Polarizer 1 polarizes the light emitted from backlight 3 in a linear fashion, thus permitting only a specific polarization of light to enter the display panel. The now linearly polarized light proceeds from rear polarizer 1 through retardation films 9 and 7 and into transparent substrate 21, with retarders 7 and 9 acting to substantially offset the retardation effect of LC layer 11. Optical axis $R_1$ of retardation film 9 is oriented substantially perpendicular to the direction of polarization caused by rear linear polarizer 1, while optical axis $R_2$ of second retardation film 7 is aligned substantially parallel to transmission axis $P_R$ of polarizer 1, these directions or orientations being maintained about ±10° in an embodiment of this invention.

After being transmitted through retardation films 9 and 7 and being affected by the respective optical axes thereof, the light proceeds into and through rear transparent substrate 21 before reaching individual pixel or colored subpixel electrodes 17. Each individual and independent electrode 17 defines either a separate pixel or colored subpixel with a corresponding color filter (not shown), electrodes 17 being substantially transparent and made of ITO in certain embodiments of this invention.

After exiting pixel electrodes 17, the light proceeds through substantially transparent polyimide rear orientation or buffing film 15 and passes into liquid crystal layer 11. When liquid crystal layer 11 is in the off state, i.e. when no voltage above threshold voltage $V_{th}$ is applied thereacross, the LC molecules therein act to twist the incoming visible light, preferably from about 80°–100°, and most preferably about ninety degrees, as it proceeds therethrough from rear orientation film 15 to front orientation film 13. This twisting is caused by the twisted alignment of LC molecules dictated by the buffing or orientation directions of films 13 and 15.

As shown in FIGS. 6 and 7, rear orientation film 15 is buffed in direction $B_1$ substantially parallel to both rear polarizer axis $P_R$ and optical axis $R_2$ of retardation film 7. Meanwhile, front orientation film 13 is buffed in direction $B_2$ substantially perpendicular to buffing direction $B_1$ of rear orientation film 15. This substantially perpendicular buffing of films 13 and 15 causes the molecules of LC layer 11 to twist about 90° when no voltage is applied thereacross.

Alternatively, directions B1 and B2 may both be rotated together about ninety degrees so that the display is "x-buffed" instead of "p-buffed."

When a driving voltage, e.g. about 6 volts, is applied across LC layer 11, the liquid crystal molecules sandwiched between films 13 and 15 tend to stand up or become vertically aligned. This permits the light originally emitted from backlight 3 to be transmitted through liquid crystal layer 11 without having its direction of polarization substantially altered. Therefore, when LC layer 11 is driven or is in the on state, the polarization direction of light exiting liquid crystal layer 11 and orientation film 13 is substantially the same as that caused by axis $P_R$ of rear polarizer 1. However, when LC layer 11 is in the off state and as a result twists the incoming light about 80°–100°, most preferably about 90°, the direction of polarization of light exiting LC layer 11 and orientation film 13 is substantially perpendicular to polarization direction $P_R$ caused by rear polarizer 1.

After exiting liquid crystal layer 11 and adjacent front orientation film 13, the light passes through transparent ITO common electrode 19 and front substrate 22 before reaching front or light-exit polarizer 5. Front linear polarizer 5 has its transmission axis $P_F$ aligned in a manner substantially perpendicular to transmission axis $P_R$ of rear polarizer 1. Therefore, when the light reaching front polarizer 5 has a polarization direction substantially parallel to direction $P_F$, a large portion of this light will be allowed to pass through polarizer 5 and reach the viewer. This occurs, of course, as discussed below, when LC layer 11 is in the off state and is, thus, allowed to twist the polarization direction of light about 90° as it passes through the LC.

However, when the polarization direction of light reaching front polarizer 5 is not aligned with direction $P_F$, e.g. if it is substantially perpendicular thereto as a result of a substantial driving voltage being applied to LC layer 11, the light is substantially blocked by polarizer 5 and is thus prevented from reaching the viewer.

As will be appreciated by those of skill in the art, different gray scale driving voltages (e.g. from about 2.0 volts to 6.0 volts) may be used so as to control the amount of light which reaches the viewer. Different gray scale driving voltages provide for different degrees of twisting caused by LC layer 11, thus, resulting in different angles of polarization of light reaching front polarizer 5. The closer the direction of polarization of light reaching polarizer 5 to transmission axis direction $P_F$, the greater the amount of light allowed to reach the viewer. In other words, the closer to 90° LC layer 11 twists the normally incident light, the more light which is allowed to pass through front polarizer 5 and reach the viewer when axes $P_R$ and $P_F$ are substantially perpendicular to one another.

This invention will now be described with respect to certain examples as follows:

EXAMPLE 1

In this first Example, a normally white light valve having a cell gap "d" of about 4.96 μm and a liquid crystal birefringence (ΔN) of about 0.084 at room temperature was manufactured and tested as follows at about 35°–40° C. The liquid crystal material used was obtained from E. Merck Ltd. or its United States representative E.M. Industries, Inc., Hawthorne, N.Y. as Model No. ZLI-4718. A conventional backlight emitted white light toward the rear of the light valve display panel in this Example.

The light valve or pixel of this Example (and all other Examples herein) had an optical arrangement as shown in FIG. 5, in that first and second retardation films were disposed on the front or viewer side of LC layer 11 and sandwiched between conventional front transparent substrate 22 and conventional front linear polarizer 5. Each of the two retardation films used in this light valve had a retardation value of about 160 nm, with optical axis $R_1$ of innermost retardation film 9 being oriented substantially parallel to both transmission axis $P_F$ of front polarizer 5 and buffing direction $B_2$ of front polyimide orientation film 13. Optical axis $R_2$ of outermost retardation film 7 was aligned substantially perpendicular to optical axis $R_1$ of adjacent retardation film 9, optical axis $R_2$ being substantially parallel to transmission axis $P_R$ of rear linear polarizer 1 and buffing direction $B_1$ of rear orientation film 15.

Both retardation films 7 and 9 utilized in the light valve of this Example were of the uniaxial type and had positive birefringent values, these retardation films being obtained from Nitto Corp., Japan, or Nitto Denko America, New Brunswick, N.J., as Model No. NRF-RF160.

Rear and front linear polarizers 1 and 5 were conventional in nature and were obtained from Nitto Denko America, Model No. G 1220DUN.

Figure 10:
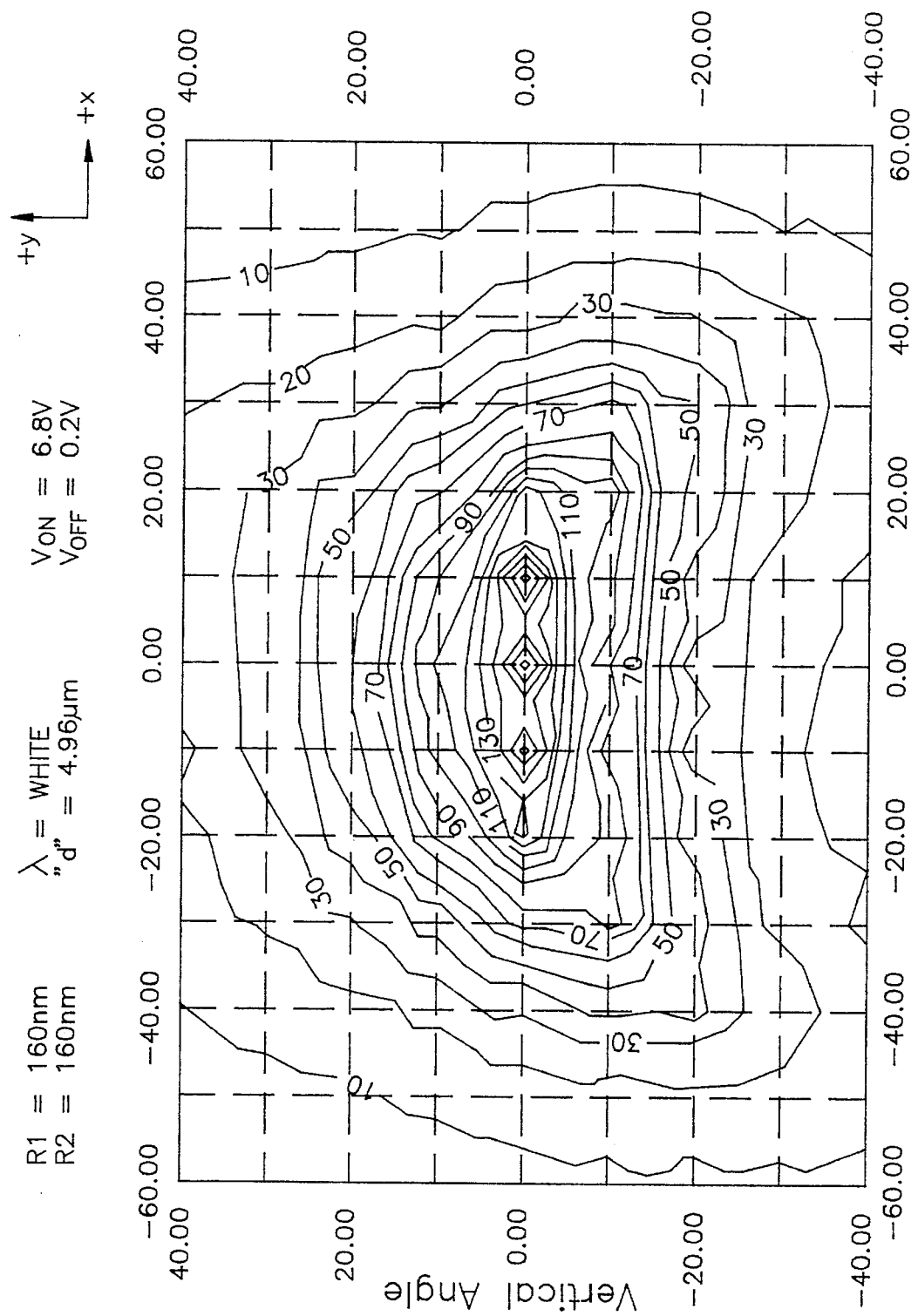
FIG. 10 is a white light contrast ratio contour plot of the NW light valve of Example 1 utilizing a driving voltage of about 6.8 volts.
Figure 11:
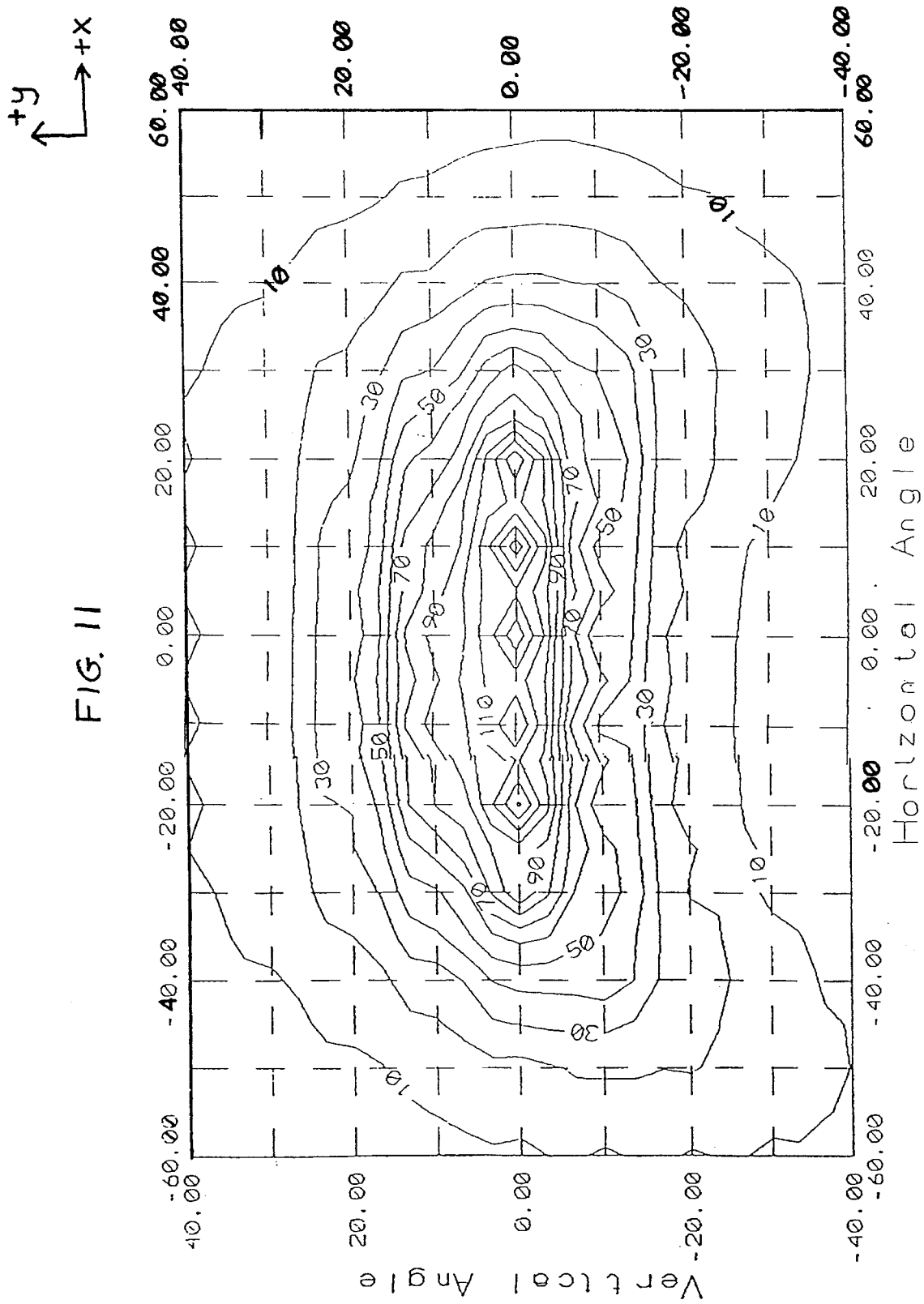
FIG. 11 is a white light contrast ratio contour plot of the NW light valve of Example 1 utilizing a driving voltage of about 5.0 volts.
Figure 12:
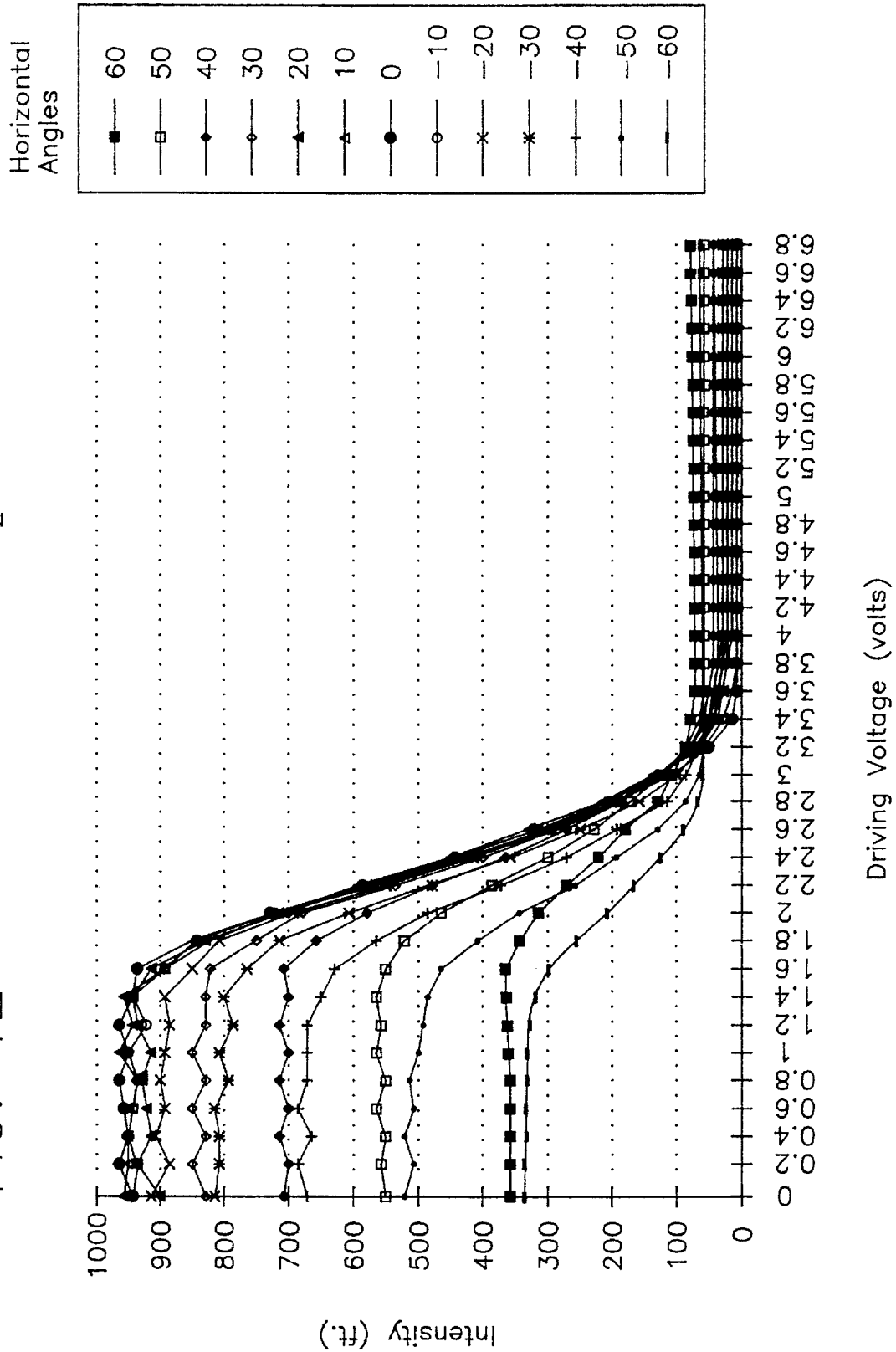
FIG. 12 is a transmission (fL) versus driving voltage plot of the normally white light valve of Example 1, the plot illustrating the viewing characteristics at a plurality of horizontal viewing angles disposed along the 0° vertical viewing axis.

FIGS. 10–12 show the test data obtained from the light valve of this Example, FIGS. 10 and 11 being contrast ratio contour graphs and FIG. 12 being an intensity versus driving voltage plot.

With respect to FIG. 10, this contour plot was formulated using a driving voltage of about 6.8 volts and an off state voltage of about 0.2 volts. In other words, the contrast ratio at each particular viewing angle was determined by dividing the 0.2 volt intensity (fL) of transmission by the corresponding 6.8 volt intensity of transmission.

As shown, the light valve of this Example had a contrast ratio of greater than about 150:1 at normal and exhibited contrast ratios of at least about 10:1 along the 0° vertical viewing axis at horizontal viewing angles of up to about ±55° when the aforesaid 6.8 volt driving voltage was used to drive the light valve. Furthermore, the light valve of this Example maintained at least about a 10:1 contrast ratio along the 0° horizontal viewing axis from about −35° vertical to about +50° vertical.

FIG. 11 illustrates the contrast ratio contour plot of this light valve when about 5.0 volts was used as the driving voltage, with the other parameters, of course, remaining the same. As can be seen, when the driving voltage dropped from about 6.8 volts to the about 5.0 volts of FIG. 11, the viewing zone or envelope shrunk vertically and expanded slightly horizontally. As shown in FIG. 11, this light valve exhibited very good contrast even with this vertical shrinking in that it exhibited a contrast ratio of at least about 10:1 or 10 along the 0° vertical viewing axis over a total of about 115°, and along the 0° horizontal viewing axis over a total of about 65° vertically.

FIG. 12 is a transmission versus driving voltage plot of the light valve of this Example for a plurality of horizontal viewing angles along the 0° vertical viewing axis, the vertical graph axis representing intensity (fL) of transmission with the corresponding horizontal axis indicating the particular driving voltage (volts) utilized. Because this was a normally white twisted nematic light valve, the intensity of light reaching the viewer, as expected, dropped as the corresponding driving voltage increased. In other words, the intensity of light transmitted to the viewer at all viewing angles was substantially greater at 2.0 volts than it was at 2.5 volts, with the 2.5 volt intensity being substantially greater than the 2.8 volt intensity, which in turn was substantially greater than the 3.0 volt intensity, etc.

It is noted that the light valve of this Example had substantially no inversion over the horizontal viewing angles plotted in FIG. 12, these viewing angles being from about −60° to +60° horizontal along the 0° vertical viewing axis. This lack of inversion is illustrated by the fact that the intensity of light transmitted to the viewer decreased monotonically with the corresponding increases in driving voltage. In other words, there were no inversion humps such as those shown in prior art FIG. 3. The inversion humps in prior art FIG. 3 are shown in that the intensity of light transmitted to the viewer at certain viewing angles actually increased as the corresponding driving voltage was raised from about 3.0 volts all the way up to about 6.0 volts, this rise in intensity along with the corresponding rise in driving voltage resulting in undesirable inversion.

Figure 3:
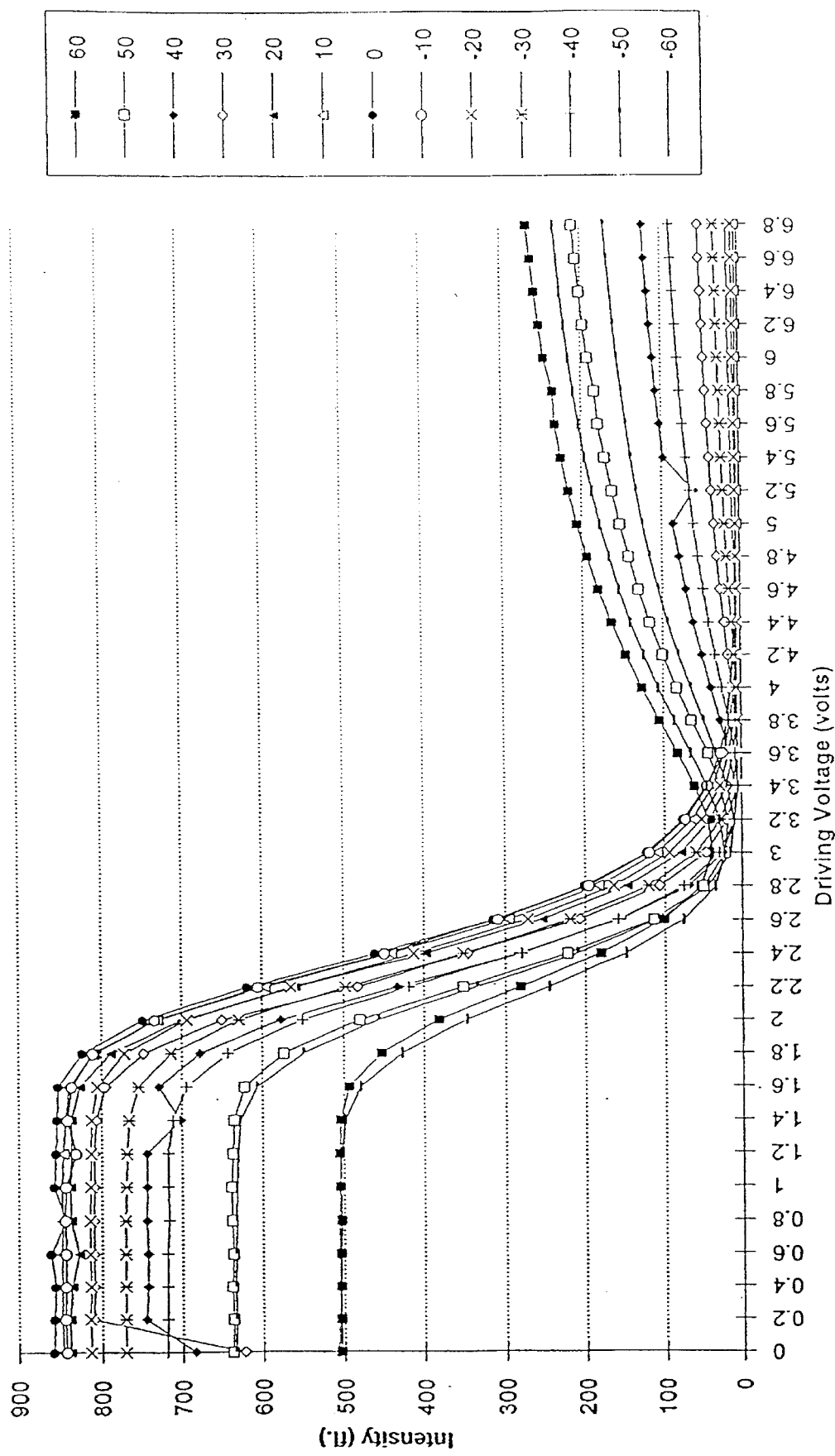
FIG. 3 is an intensity versus driving voltage plot of the prior art light valve of FIGS. 1 and 2. This plot illustrates a fairly large amount of inversion over a wide range of horizontal viewing angles at driving voltages of greater than about 3.2 volts.
Figure 4:
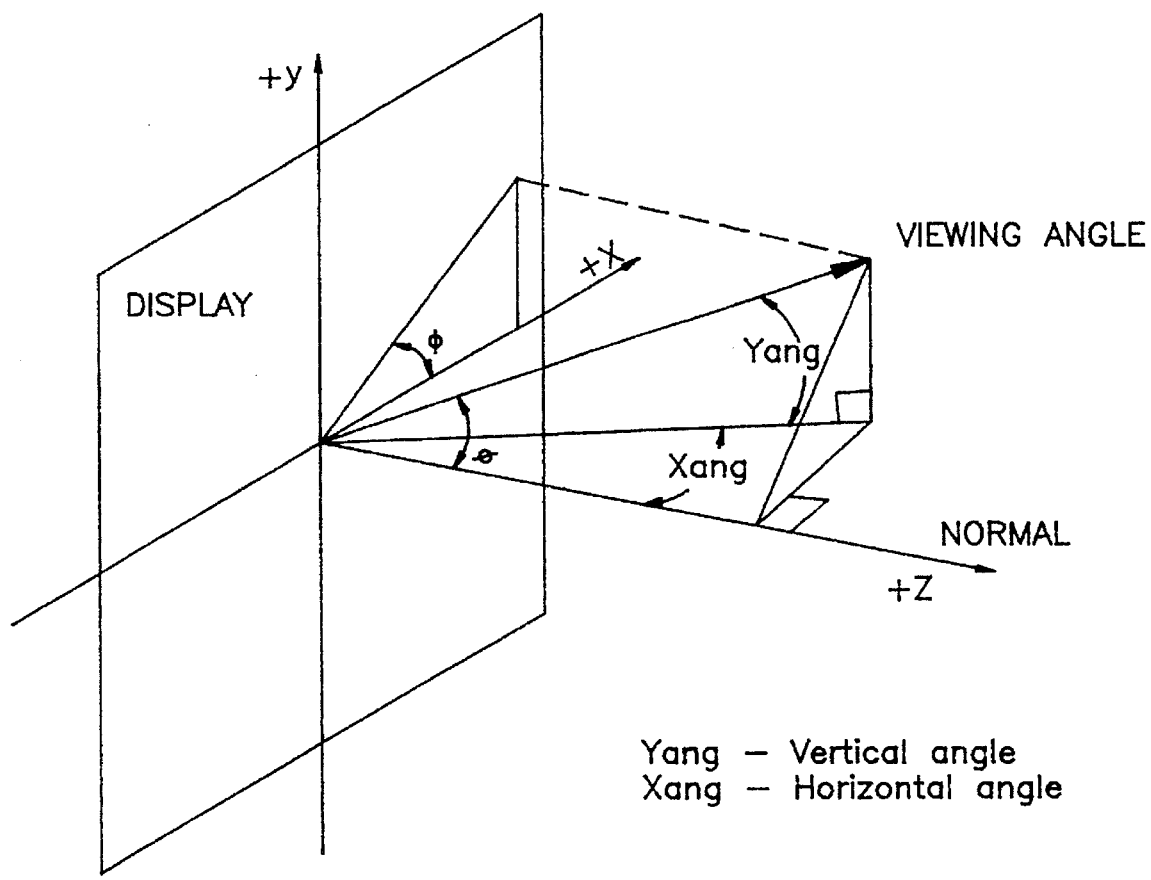
FIG. 4 is a graph illustrating the angular relationship between the horizontal and vertical viewing angles discussed herein, and their relationship with the conventional liquid crystal display angles: azimuthal angle $\phi$; and polar angle $\Theta$.

When comparing FIG. 3 with FIG. 12 of this Example, it is pointed out that the inversion of the prior art has been substantially eliminated by the insertion of retardation films 7 and 9 into the display panel, both on one side of LC layer 11. This lack of inversion allows the viewer to view substantially identical images at different viewing angles, instead of, as in the prior art, seeing one image at normal and another at 40° or 50° horizontal when gray scale driving voltages between 3.0 volts and 6.0 volts are utilized, the different images resulting from the undesirable inversion effects discussed above.

EXAMPLE 2

In this Example, another light valve display was manufactured and tested, the optical structure of this light valve and corresponding testing conditions being identical to those of Example 1 except for the thickness "d" or cell gap of the liquid crystal material. In this Example, the cell gap "d" was about 5.86 μm, while it was only about 4.96 μm in Example 1. Other than this change in cell gap, all other parameters, including retardation values, remained the same with respect to the first Example.

Figure 13:
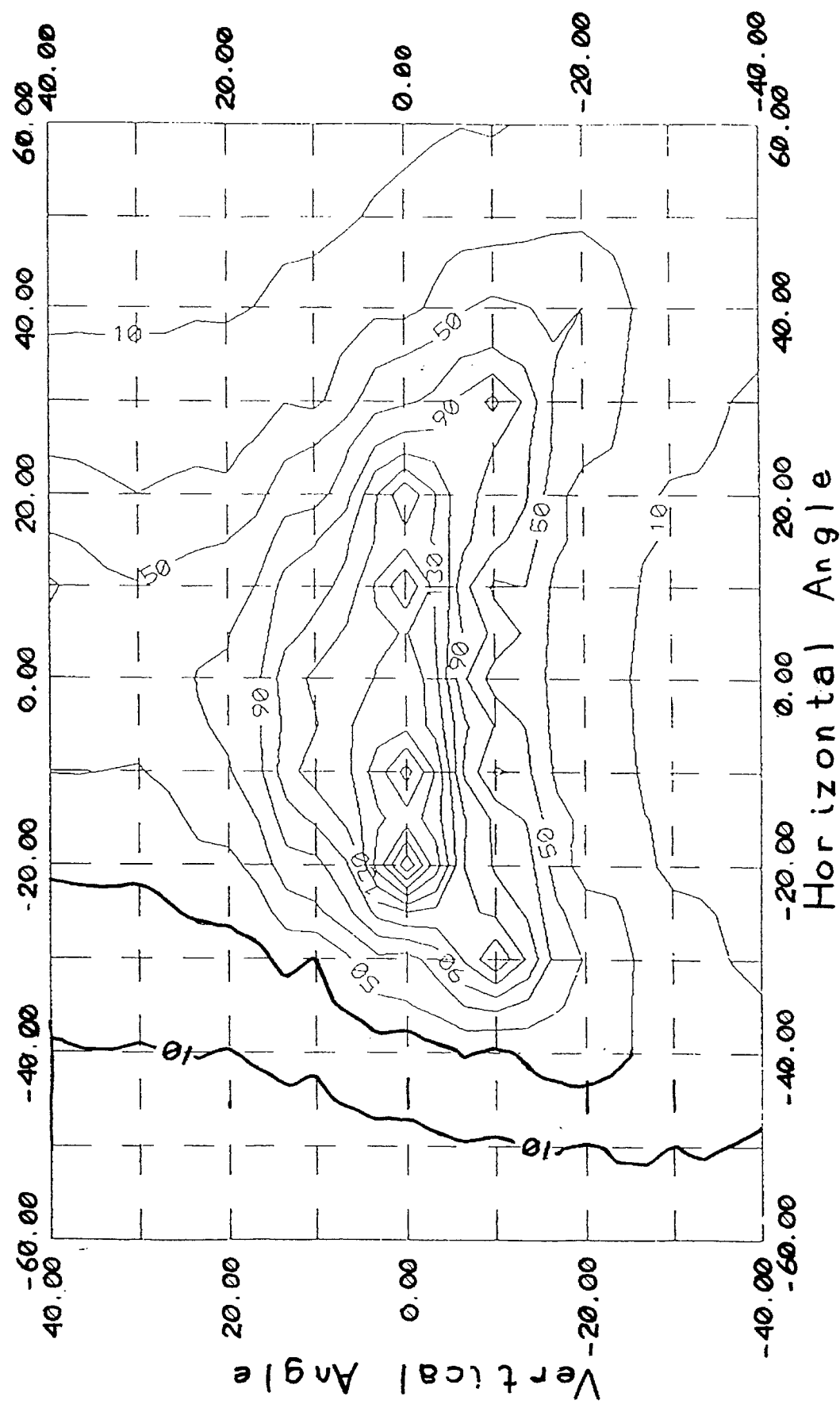
FIG. 13 is a white light contrast ratio contour plot of the NW light valve of Example 2 utilizing a driving voltage of about 6.8 volts.
Figure 14:
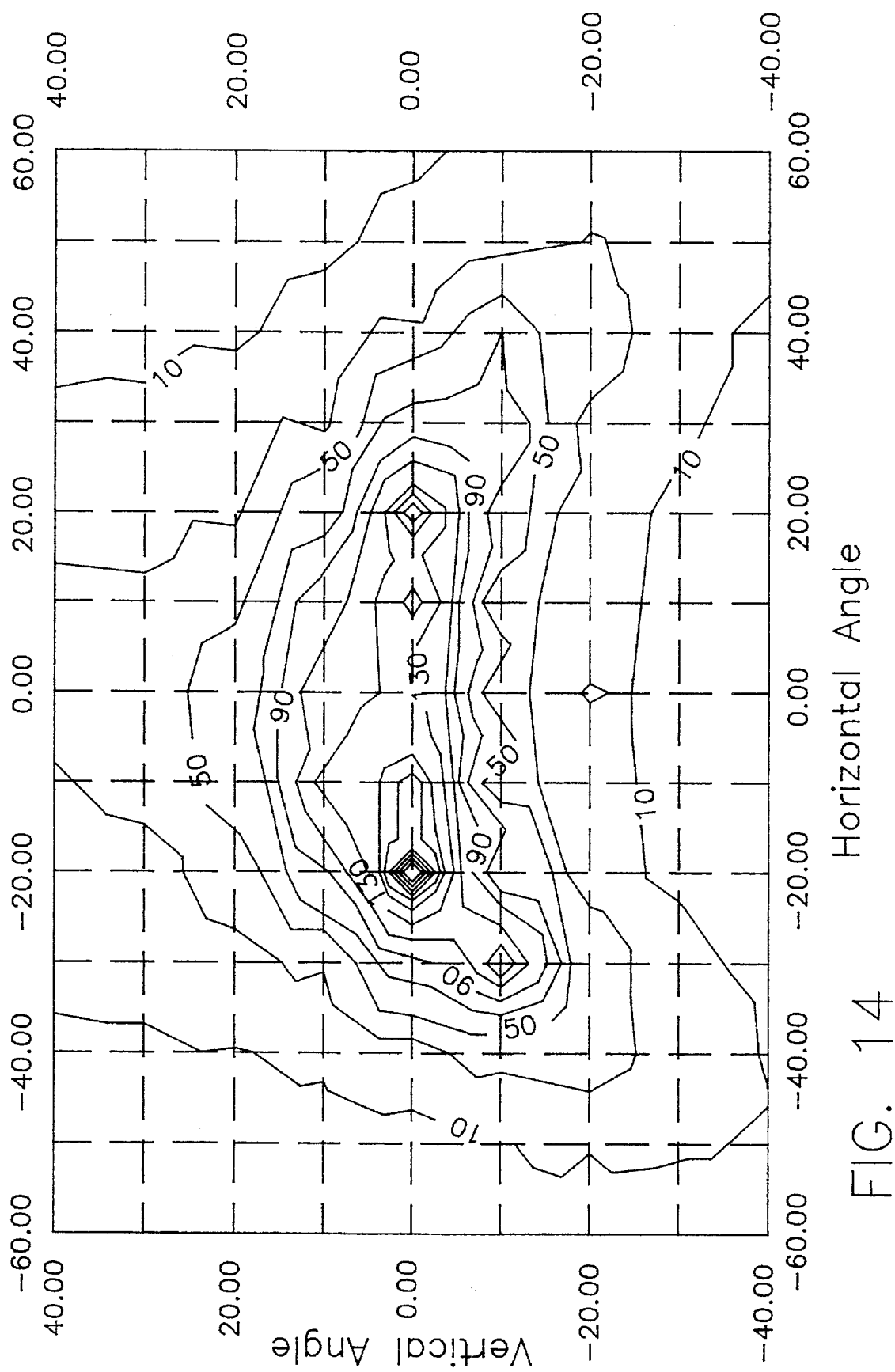
FIG. 14 is a white light contrast ratio contour plot of the NW light valve of Example 2 utilizing a driving voltage of about 6.0 volts.

FIGS. 13–14 illustrate the resulting contrast ratio contour plots for the light valve of this Example. As shown in FIG. 13, the increase in cell gap "d" in this Example altered the overall shape of the viewing zone or envelope. When comparing the contour plot of FIG. 13 with that of FIG. 10, it appears that the increase in cell gap caused the viewing envelope having at least about a 10:1 contrast ratio to shrink slightly along the 0° vertical viewing axis from a total of about 110° in FIG. 10, to one of about 100° in FIG. 13.

Furthermore, the resulting contrast ratios along the 0° horizontal viewing axis at vertical angles around about −30° appear to have decreased with respect to those of FIG. 10. However, the light valve of this Example still exhibited very good contrast ratios over an extended viewing zone or envelope as shown in FIG. 13.

FIG. 14 simply illustrates the resulting contrast ratio contour plots of the light valve of this Example utilizing a driving voltage of about 6.0 volts instead of the about 6.8 volt driving voltage of FIG. 13. As shown, there is relatively little difference in these two plots as a result of the change in driving voltage.

EXAMPLE 3

In this third Example, a normally white amorphous silicon TFT driven AMLCD was manufactured and tested as follows at about room temperature. This AMLCD was of the multicolored type, with each pixel including red, green, and blue subpixels arranged in a triangular fashion. The liquid crystal material filled red subpixel gaps "d" of about 5.1 μm, and blue and green subpixel gaps "d" of about 5.6 μm. Conventional color filters were, of course, provided in each colored subpixel as is known in the art. The liquid crystal material and polarizers were the same as used and described in Example 1. The optical structure, (i.e. buffing directions, retardation axes directions, polarizer directions, etc.) of the AMLCD of this Example is shown in FIGS. 5 and 7 herein, save the presence of the unshown color filters.

Retardation films 7 and 9 of this AMLCD each were of the uniaxial type and had positive birefringent values, the retardation value of each film 7 and 9 being about 160 nm. White light was used to illuminate the display panel of this Example in order to achieve the following test results, with directions $P_R$, $R_2$, and $B_1$ all being substantially parallel (± about 10°) to one another and directions $R_1$, $B_2$, and $P_F$ also being substantially parallel (± about 10°) to one another as shown in FIG. 7.

Figure 15:
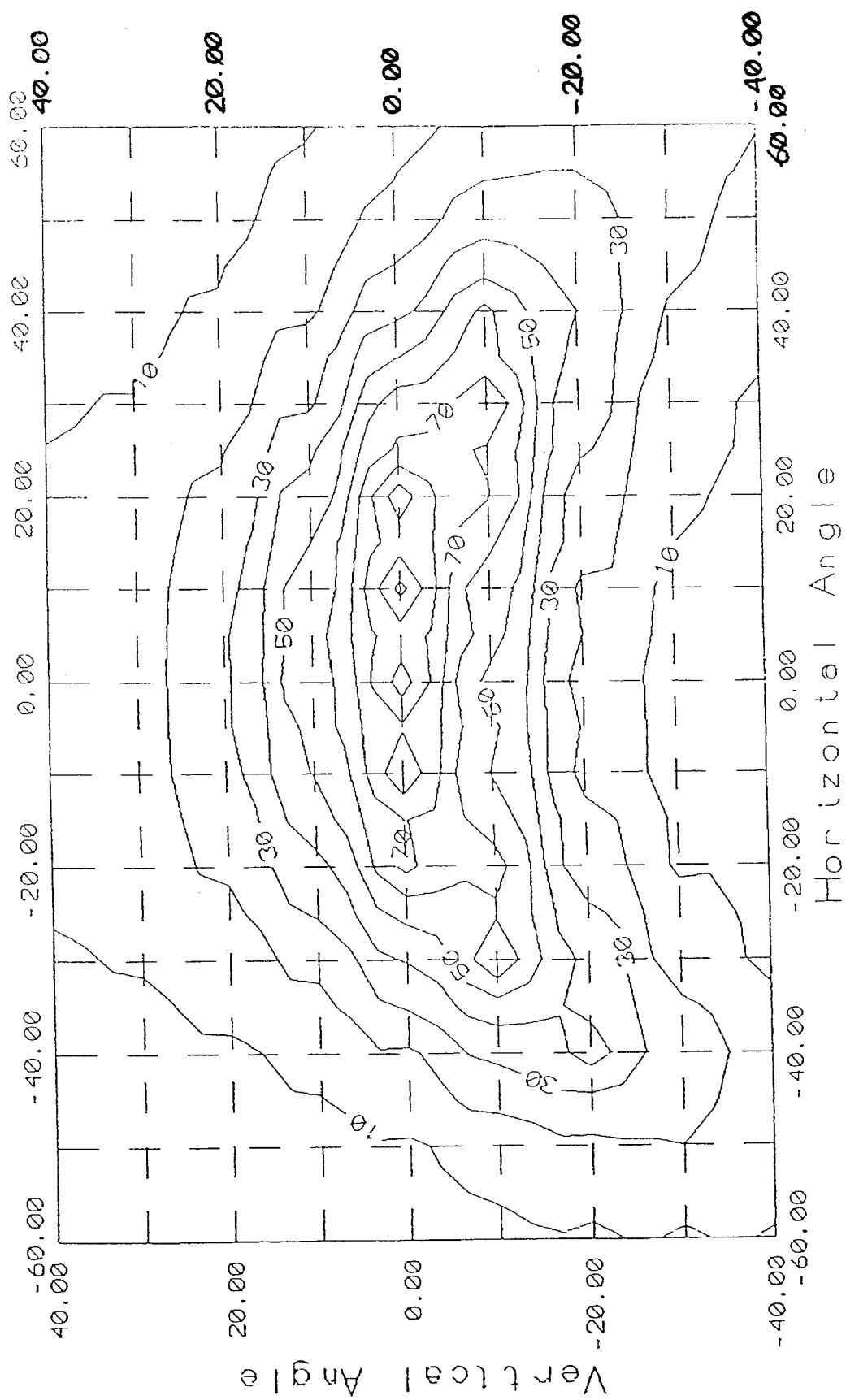
FIG. 15 is a white light contrast ratio contour plot of the NW a-Si TFT driven AMLCD of Example 3 utilizing about a 6.8 volt driving voltage.
Figure 16:
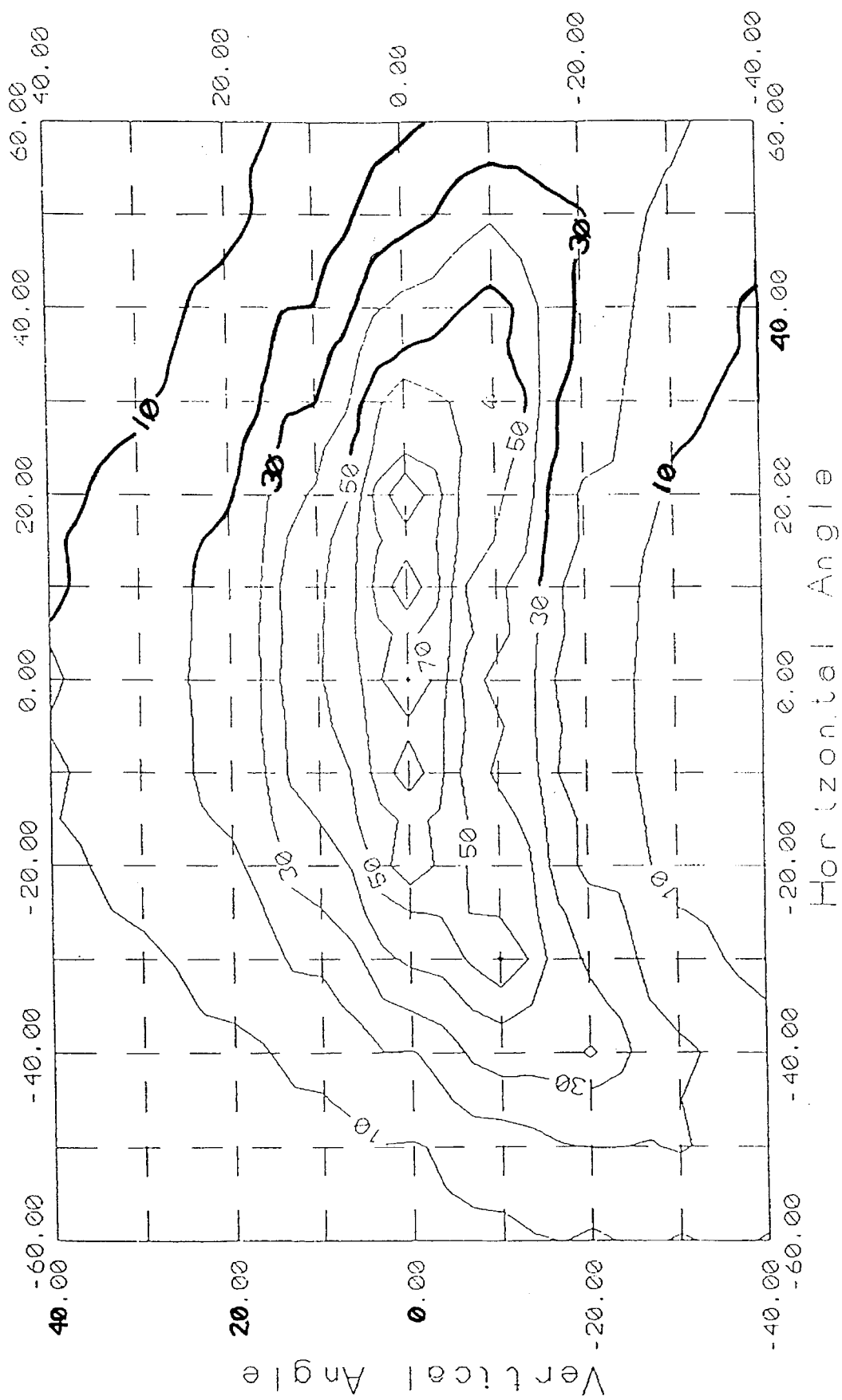
FIG. 16 is a white light contrast ratio contour plot of the NW AMLCD of Example 3 utilizing about a 6.0 volt driving voltage.

FIGS. 15–16 illustrate the contrast ratio contour plots of the AMLCD of this Example, FIG. 15 being formulated using about a 6.8 volt driving voltage and FIG. 16 utilizing about a 6.0 volt driving voltage. $V_{common}$ was about 8 volts in this AMLCD Example. As shown in FIG. 15, this display exhibited very good contrast ratios over an enlarged viewing zone or envelope as compared to that of the prior art shown in FIG. 1. This display exhibited a contrast ratio of at least about 10:1 over a total of at least about 115° along the 0° vertical viewing axis, this being an improvement of about 35° over that of the prior art shown in FIG. 1.

It is noted that the viewing envelope is skewed slightly in the positive horizontal direction, in that it extends further along the 0° vertical viewing axis in the positive horizontal direction than it does in the negative horizontal direction. This is believed to be due to the fact that both retardation films 7 and 9 in this Example were disposed on the viewer side of the liquid crystal layer. If, however, retardation films 7 and 9 were to be disposed rearward of LC layer 11 as shown in FIG. 6, then the resulting viewing zone would be substantially inverted with respect to that shown in FIG. 15. In other words, the positioning of films 7 and 9 rearward of LC layer 11 would result in the viewing envelope extending along the 0° vertical viewing axis further in the negative horizontal direction than in the positive horizontal direction. This may be advantageous when particular customers desire increased viewing characteristics in particular horizontal directions, i.e. positive or negative.

FIG. 16 illustrates the contrast ratio contour plot of the AMLCD of this Example when about 6.0 volts was utilized as the driving voltage. As shown, the display of this Example exhibited superior contrast with respect to the prior art shown in FIG. 2. In the prior art, i.e. FIG. 2, the resulting contrast ratio plot showed contrast ratios of about 10:1 or greater along the 0° vertical viewing axis over a total of about 85°, while this display exhibited contrast ratios of about 10:1 or greater along the 0° vertical viewing axis over a total of at least about 120°. Thus, a significant improvement over the prior art is evident.

EXAMPLE 4

Figure 17:
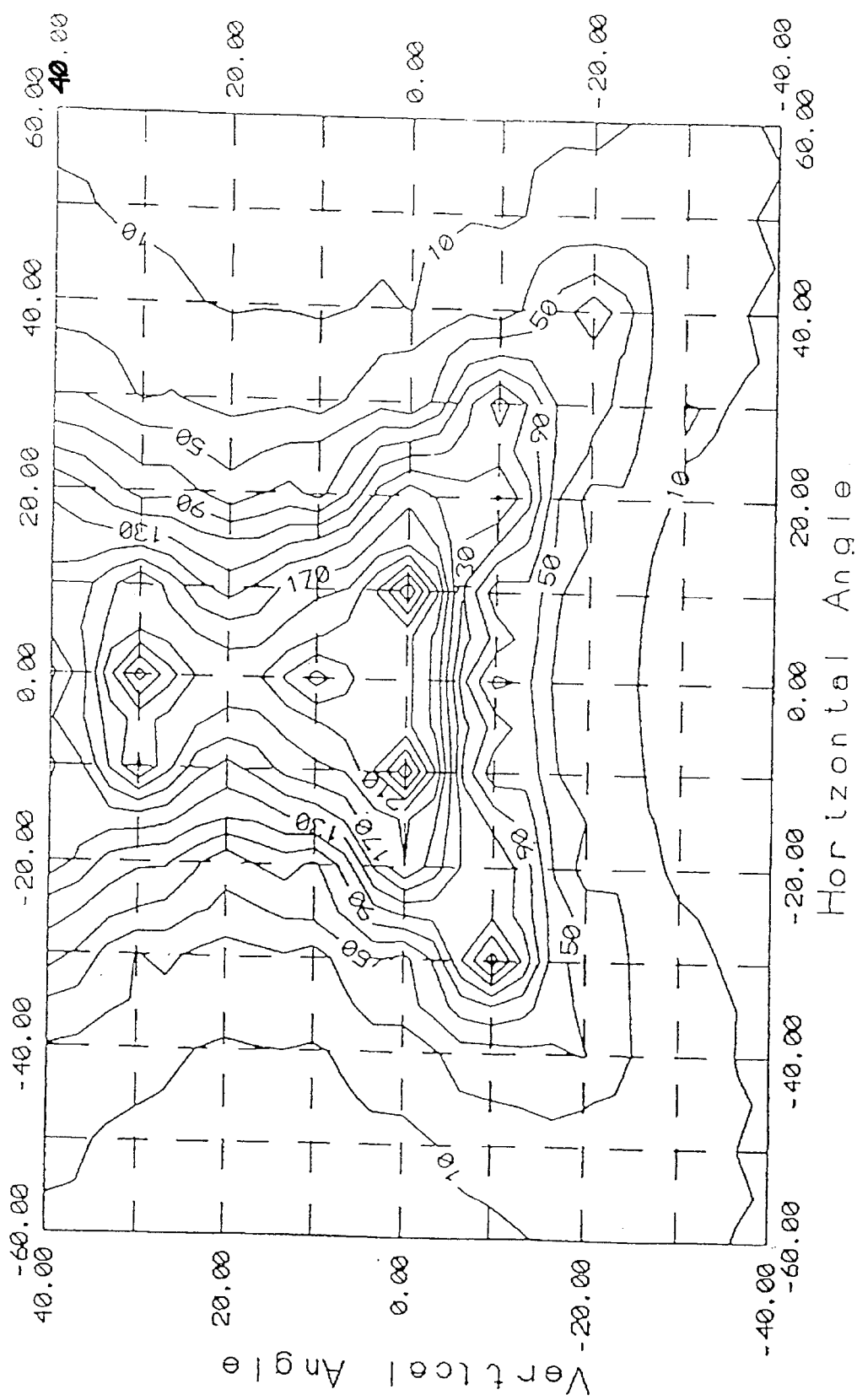
FIG. 17 is a contrast ratio contour plot of a NW twisted nematic pixel according to a computer simulation described in Example 4, this plot utilizing a 550 nm backlight and a $V_{on}$ of about 6.8 V.

FIG. 17 is a computer simulation contrast ratio plot or graph of a normally white light valve according to an embodiment of this invention, the light valve utilizing a pair of retardation films 7 and 9 having retardation values of 120 nm each, the retardation films being of the positively birefringent uniaxial type.

This computer simulation was conducted using simulation software written by Dr. Dwight Berreman, Scotch Plains, N.J. The software is described and referenced in one of Dr. Berreman's publications entitled "Numerical Modeling of Twisted Nematic Devices", Phil Trans. R. Soc. Lond. A309, 203–216 (1983) which was printed in Great Britain.

The optical structure of the light valve of this simulation is shown in FIG. 5 with directions $P_F$, $R_1$ and $B_2$ all being substantially parallel (± about 10°) to one another, and directions $P_R$, $B_1$, and $R_2$ also be substantially parallel to one another. Light having a wavelength of 550 nm was utilized in determining the contrast ratios shown in FIG. 17. The simulated light valve of this Example had a cell gap "d" of about 5.7 μm and utilized the liquid crystal material and polarizers described in Example 1.

The contrast ratio plot of FIG. 17 illustrates the fact that the disposition of a pair of 120 nm retardation films forward of LC layer 11 in this simulation substantially enlarges the viewing zone or envelope with respect to the prior art zone of FIG. 1. For example, the contrast ratio plot illustrates contrast ratios of at least about 10:1 at the following viewing angles: (i) −35° vertical, ±50° to 60° horizontal; and (ii) +40° vertical, ±50° horizontal. Such high contrast ratios at these particular viewing angles are notable improvements over the prior art light valve results of FIG. 1.

EXAMPLE 5

In this Example, a normally white a-Si TFT driven AMLCD was manufactured and tested utilizing a pair of biaxial retardation films obtained from Allied Signal Corporation, the retardation films being disposed frontward of the liquid crystal layer as shown in FIG. 5. This AMLCD was multi-colored in that each pixel had a red, green, and blue subpixel. The red cell gaps "d" were about 5.1 μm while the green and blue cell gaps "d" were about 5.7 μm.

Retardation films 7 and 9 had indices of refraction of about $n_X=1.4305$; $n_Y=1.4275$; and $n_Z=1.4261$ according to the supplier. Directions X, Y and Z of indices of refraction $n_X$, $n_Y$, and $n_Z$ respectively are shown in FIG. 21, these directions being separate and distinct from viewing angle directions X, Y, and Z discussed herein and shown in FIGS. 1–8 and 10–20. These two biaxial retardation films had identical retardation values of about $d \cdot \Delta_{ZX}=-167.6$ nm and $d \cdot \Delta_{ZY}=-53.3$ nm where "d" was the thickness of each respective retardation film. Because the retardation values are negative, the retardation films are said to have negative birefringence.

The term $d \cdot \Delta_{ZX}$ is defined as $d \cdot (n_Z - n_X)$ wherein $n_X$ is the largest index of refraction in the film and $n_Z$ is the smallest. Therefore, $d \cdot \Delta_{ZX}$ is generally the largest retardation value of the film. Likewise, the term $d \cdot \Delta_{ZY}$ is defined as $d \cdot (n_Z - n_Y)$ wherein $n_Z$ is the smallest index of refraction and $n_Y$ is the intermediate index of refraction. The "$n_Z$" axis is, of course, substantially perpendicular to the general plane of the film and with respect to the "$n_X$" and "$n_Y$" axes as shown in FIG. 21.

As shown in FIG. 5, axes $R_1$ and $R_2$ are the retardation film optical axes having the largest indices of refraction ($n_X$). Therefore, in the AMLCD of this Example, directions $R_1$, $B_2$ and $P_F$ were substantially parallel to one another, while directions $P_R$, $B_1$, and $R_2$ were also substantially parallel to one another. Of course, axes $R_1$ and $R_2$ were substantially perpendicular ± about 10° to one another as in the other Examples herein.

Figure 18:
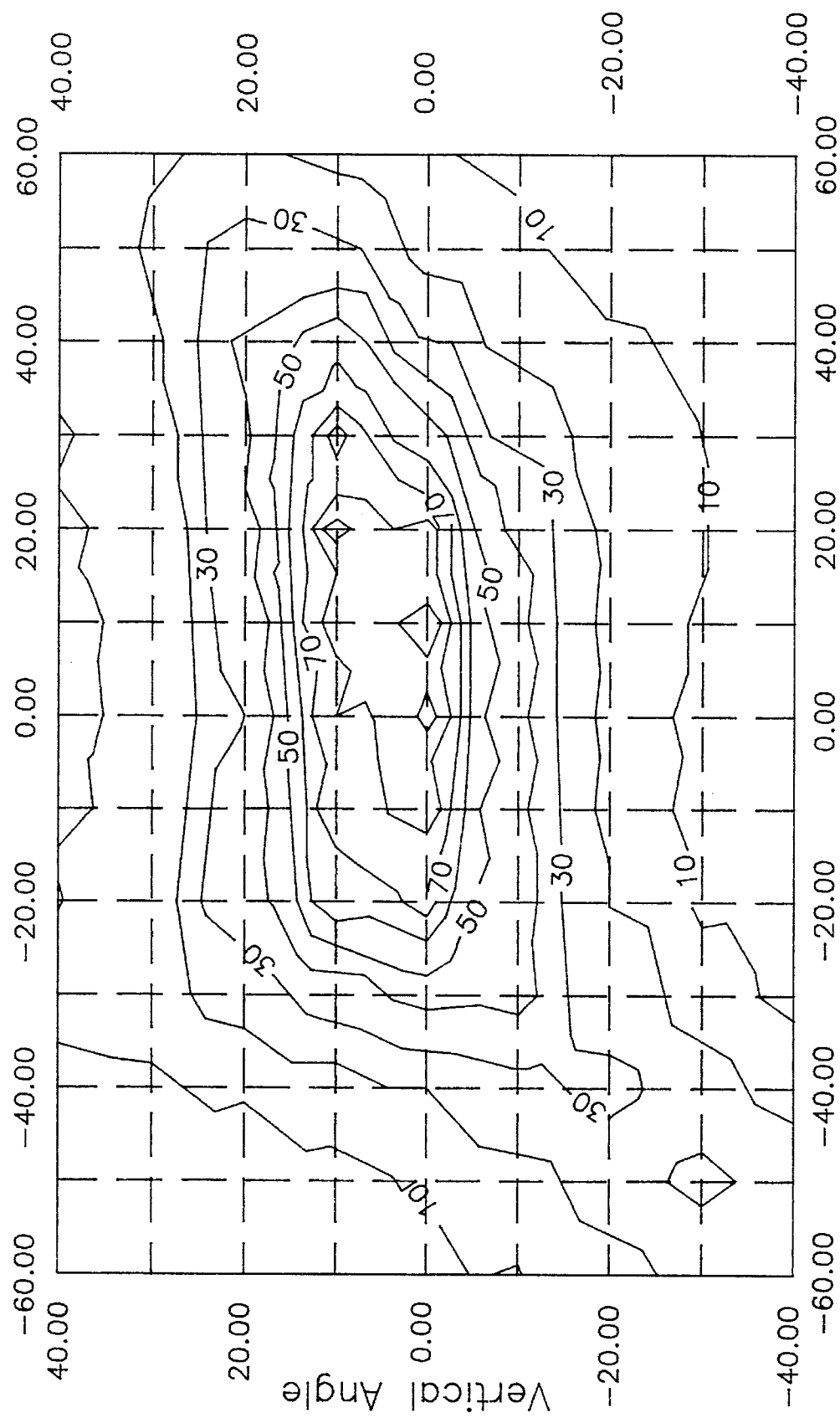
FIG. 18 is a white light contrast ratio contour plot of the NW AMLCD of Example 5 utilizing about a 6.8 volt driving voltage and a pair of biaxial retardation films disposed forward of the LC layer.

As shown in the plot of FIG. 18 which utilized about a 6.8 volt driving voltage, about a 0.2 volt "off state" voltage, and a $V_{common}$ of about 8 volts, the AMLCD of this Example utilizing biaxial retardation films exhibited outstanding contrast ratios over a large range of viewing angles. For example, about 10:1 contrast ratios or greater were present along the 0° vertical viewing axis at horizontal angles of up to about −50° and +65°, thereby defining an overall horizontal range of about 115°. Furthermore, such contrast ratios were also present at viewing angles of about +30° vertical, +60° horizontal; and −50° vertical, −70° horizontal. Such high contrast ratios at these large viewing angles are clearly an improvement over the prior art shown in FIG. 1.

Biaxial retardation films having retardation values in the range of about $d \cdot \Delta_{ZX}=-100$ to $-200$ nm; and $d \cdot \Delta_{ZY}=-10$ to $-100$ nm provide such improved viewing characteristics.

Figure 19:
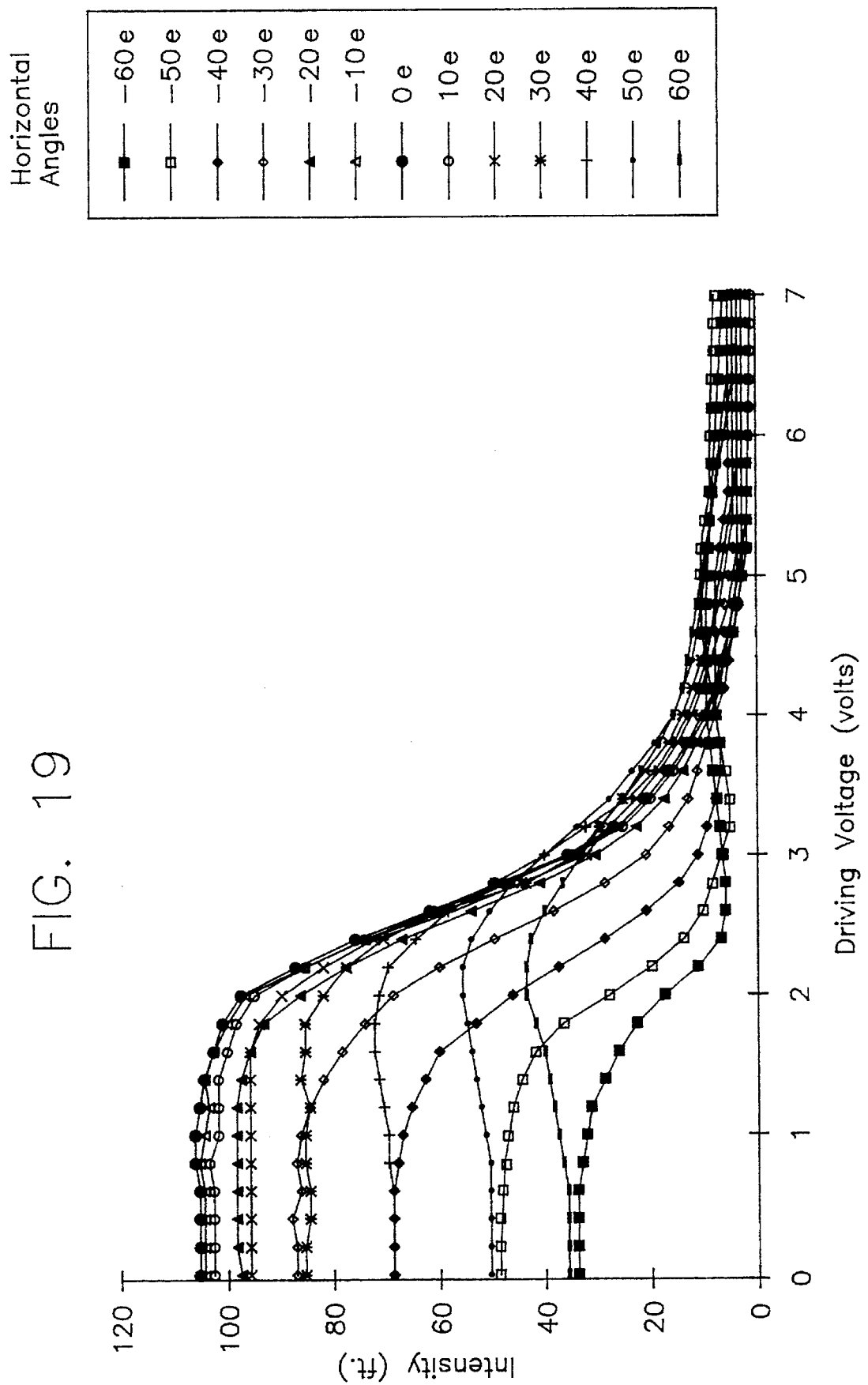
FIG. 19 is a transmission (fL) versus driving voltage plot of the normally white AMLCD of Example 5 for a plurality of horizontal viewing angles along the 0° vertical viewing axis.

FIGS. 19–20 are transmission or intensity (fL) versus driving voltage plots for the NW AMLCD of this Example. As shown, the provision of biaxial retardation films on the same side of the LC layer substantially eliminated the prior art problem of inversion. FIG. 19 illustrates virtually no inversion humps while FIG. 20 shows inversion only slightly at vertical viewing angles of about −30° to −40°. In sum, the provision of the biaxial retarders of the aforesaid values not only allows excellent contrast ratios over a large range of predetermined viewing angles, but also substantially eliminates the adverse effects of inversion at most viewing angles. This concludes the Example section herein.

The specific electrodes, substrates, orientation films, LC material, and linear polarizers present in the displays and light valves described above were conventional in nature as known to those of skill in the art.

The pre-tilt angle of the displays, light valves, and simulations herein was about 3°, and the value of "d/p" (thickness/natural pitch of the liquid crystal material) of a liquid crystal layer of these figures was set to about 0.25.

As is evident from the results of the aforesaid Examples, the provision of a pair of retardation films having substantially perpendicular optical axes and retardation valves as defined herein on a single side of the liquid crystal layer between the LC and a particular polarizer (exit or entrance) provides for a liquid crystal display of improved viewing characteristics, most notably an enlarged viewing zone or envelope with respect to contrast ratio and the substantial elimination of inversion. As will be appreciated by those of skill in the art, the provision of a normally white twisted nematic LCD having an enlarged viewing zone and reduced inversion is a significant improvement over conventional normally white LCDs, the improvement allowing the substantially cheaper to manufacture normally white displays to take the place of the more expensive normally black displays with the resulting NW displays having little or no inversion and an enlarged viewing envelope similar to those of normally black displays.

Once given the above disclosure, many other features, modifications, and improvements will become apparent to the skilled artisan. Such other features, modifications, and improvements are, therefore, considered to be a part of this invention, the scope of which is to be determined by the following claims:

We claim:

1. A normally white liquid crystal display comprising:
   a rear, light-entrance polarizer having a transmission axis oriented in a first direction;
   a front, light-exit polarizer having a transmission axis oriented in a second direction with respect to said first direction so as to define a normally white display;
   first and second positively birefringent uniaxial retardation films both disposed between a twisted nematic liquid crystal layer and one of: (i) said rear, light-entrance polarizer; and (ii) said front, light-exit polarizer;
   wherein said liquid crystal layer in the off state twists at least one normally incident visible wavelength of light less than about 110° as it passes therethrough, and said first and second uniaxial retardation films each have retardation values of from about 80–200 nm; and
   wherein the transmission axes of said polarizers and optical axes of said retardation films are so arranged each with respect to the others so as to achieve high contrast ratios over a large range of predetermined viewing angles.

2. The display of claim 1, wherein said first and second retardation films each have retardation values of from about 100–170 nm.

3. The display of claim 2, wherein said first and second retardation films each have retardation values of from about 120–160 nm.

4. The display of claim 2, wherein said liquid crystal layer is from about 4.8–6.5 μm thick with a birefringence of from about 0.075–0.095 at room temperature.

5. The display of claim 4, wherein said liquid crystal layer is sandwiched between rear and front orientation means for aligning molecules of said liquid crystal material, said rear orientation means having a buffing or orientation direction substantially parallel to the transmission axis of said rear polarizer, and said front orientation means having a buffing or orientation direction substantially parallel to the transmission axis of said front polarizer.

6. The display of claim 4, wherein said display has a white light contrast ratio of at least about 10:1 when about a 6 volt driving voltage is applied thereto at viewing angles of about 0° vertical, ±50° horizontal.

7. The display of claim 4, wherein certain contrast ratio contours of said display extend further in one horizontal direction than the other such that said display has about a 10:1 contrast ratio when about a 6 volt driving voltage is applied thereto at a viewing angle of one of about: (i) 0° vertical, 55° horizontal; and (ii) 0° vertical, −55° horizontal.

8. The display of claim 4, wherein an angle of from about 80°–100° is defined between the respective optical axes of said first and second retardation films.

9. The display of claim 8, wherein an angle of from about 85°–95° is defined between said optical axes of said first and second retardation films such that said optical axis of said first retardation film is substantially parallel to the transmission axis of said front polarizer and said optical axis of said second retardation film is substantially parallel to the transmission axis of said rear polarizer.

10. A normally white liquid crystal display comprising:
a rear, light-entrance polarizer having a transmission axis oriented in a first direction;
a front, light-exit polarizer having a transmission axis oriented in a second direction wherein said first and second directions are oriented so as to define a normally white display;
first and second biaxial retardation films both disposed between a twisted nematic liquid crystal layer and one of said rear and front polarizers, wherein said liquid crystal layer in the off state twists at least one wavelength of normally incident visible light at least about 85° as it passes therethrough; and
wherein said first and second biaxial retardation films each have the following retardation values:

$d \cdot \Delta n_{ZX}$=from about −100 to −200 nm $d \cdot \Delta n_{ZY}$=from about −10 to −100 nm wherein $n_X > n_Y > n_Z$ and "d" is the thickness of the film such that the viewing zone of said display has high contrast ratios and reduced inversion throughout an enlarged range of viewing angles.

11. The display of claim 10, wherein the optical axis having the largest index of refraction $n_X$ of the biaxial retardation film disposed closest to said liquid crystal layer is aligned substantially parallel to the buffing or orientation direction of an adjacent orientation film, said orientation film being disposed between said liquid crystal layer and said first and second biaxial retardation films.

12. The display of claim 11, wherein said buffing or orientation direction is substantially parallel to the polarizer transmission axis disposed on the same side of said liquid crystal layer.

13. The display of claim 11, wherein said first and second retardation films have retardation values $d \cdot \Delta n_{ZX}$ of from about −140 to −180 nm.

14. The display of claim 10, wherein said first and second retardation films each have the following retardation values:

$d \cdot \Delta n_{ZX}$=from about −120 to −180 nm $d \cdot \Delta n_{ZY}$=from about −40 to −80 nm.

15. A normally white twisted nematic liquid crystal display comprising:
a plurality of pixels, each said pixel including electrode means and a twisted nematic liquid crystal layer for twisting at least one normally incident visible wavelength of light passing therethrough from about 80° to 100° when the liquid crystal layer is in the off state;
a rear light-entrance polarizer having a transmission axis oriented in a first direction;
a front, light-exit polarizer or analyzer having a transmission axis oriented in a second direction with respect to said first direction thereby defining a twisted nematic normally white display;
a first retardation film;
a second retardation film; and
wherein the transmission axes of said rear and front polarizers and the optical axes of said first and second retardation films are so arranged with respect to the others so as to achieve a white light contrast ratio of at least about 10:1 over a horizontal angular span, at a predetermined vertical angle, of at least about 120° and over a vertical angular span of greater than about 50° at a predetermined horizontal angle.

16. The display of claim 15, wherein said display has a contrast ratio of at least about 10:1 over a horizontal angular span of at least about 120° and over a vertical angular span of greater than about 60° when about 6.0 volts is applied to said display.

17. The display of claim 16, wherein said display has a contrast ratio of at least about 30:1 over a horizontal angular span of at least about 80° and over a vertical angular span of greater than about 30°.

18. The display of claim 15, wherein said first and second retardation films have retardation values, positive or negative, of from about 80–200 nm.

19. The display of claim 15, wherein said first and second retardation films are on the same side of said liquid crystal layer.

20. A normally white twisted nematic liquid crystal display comprising:
a twisted nematic liquid crystal layer which twists at least one normally incident visible wavelength of light from about 80°–100° as it passes therethrough when the liquid crystal is in the off state;
electrode means for applying voltage to said liquid crystal layer so as to selectively display image data to a viewer;
a first negative retardation film having a retardation value of from about −80 to −200 nm;
a second negative retardation film having a retardation value of from about −80 to −200 nm; and
wherein the optical axes of said first and second negative retardation films are oriented relative to one another so as to achieve a high contrast ratio over a predetermined range of viewing angles.

21. The display of claim 20, wherein the optical axes of each of said first and second retardation films are substantially parallel to the normal viewing axis.

22. The display of claim 20, wherein the display has a contrast ratio of at least about 10:1 over a horizontal angular span of at least about 120° and a vertical angular span of greater than about 60° when about 6.0 volts is applied to the display.

23. The display of claim 20, wherein the indices of refraction of each of said first and second negative retarders are characterized by the equations:

$d \cdot \Delta n_{ZX} = d \cdot \Delta n_{ZY}$ and $n_X > n_Z$.

* * * * *